(12) United States Patent
Su et al.

(10) Patent No.: US 11,335,346 B1
(45) Date of Patent: May 17, 2022

(54) NATURAL LANGUAGE UNDERSTANDING PROCESSING

(71) Applicant: Amazon Technologies, Inc., Seattle, WA (US)

(72) Inventors: Chengwei Su, Belmont, MA (US); Spyridon Matsoukas, Hopkinton, MA (US); Sankaranarayanan Ananthakrishnan, Belmont, MA (US); Shirin Saleem, Belmont, MA (US); Chungnam Chan, Westford, MA (US); Yugang Li, Belmont, MA (US); Mallory McManamon, Seattle, WA (US); Rahul Gupta, Cambridge, MA (US); Luca Soldaini, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 466 days.

(21) Appl. No.: 16/215,061

(22) Filed: Dec. 10, 2018

(51) Int. Cl.
| | | |
|---|---|---|
| *G10L 15/26* | (2006.01) | |
| *G06K 9/62* | (2022.01) | |
| *G06N 20/10* | (2019.01) | |
| *G06N 7/00* | (2006.01) | |
| *G06F 40/295* | (2020.01) | |

(52) U.S. Cl.
CPC ............ *G10L 15/26* (2013.01); *G06F 40/295* (2020.01); *G06K 9/6267* (2013.01); *G06N 7/00* (2013.01); *G06N 20/10* (2019.01)

(58) Field of Classification Search
None
See application file for complete search history.

(56) References Cited

U.S. PATENT DOCUMENTS

| | | | |
|---|---|---|---|
| 9,558,740 B1* | 1/2017 | Mairesse | ................. G10L 15/08 |
| 2014/0379349 A1* | 12/2014 | Bangalore | ........... G06F 16/3334 704/257 |
| 2015/0142420 A1* | 5/2015 | Sarikaya | ................. G06F 40/35 704/9 |
| 2017/0162203 A1* | 6/2017 | Huang | .................. G10L 15/285 |
| 2019/0259380 A1* | 8/2019 | Biyani | .................... G10L 15/19 |

* cited by examiner

*Primary Examiner* — Nafiz E Hoque
(74) *Attorney, Agent, or Firm* — Pierce Atwood LLP

(57) ABSTRACT

Techniques for processing a user input are described. Text data representing a user input is processed with respect to at least one finite state transducer (FST) to generate at least one FST hypothesis. Context information may be required to traverse one or more paths of the at least one FST. The text data is also processed using at least one statistical model (e.g., perform intent classification, named entity recognition, and/or domain classification processing) to generate at least one statistical model hypothesis. The at least one FST hypothesis and the at least one statistical model hypothesis are input to a reranker that determines a most likely interpretation of the user input.

20 Claims, 17 Drawing Sheets

NATURAL LANGUAGE UNDERSTANDING PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
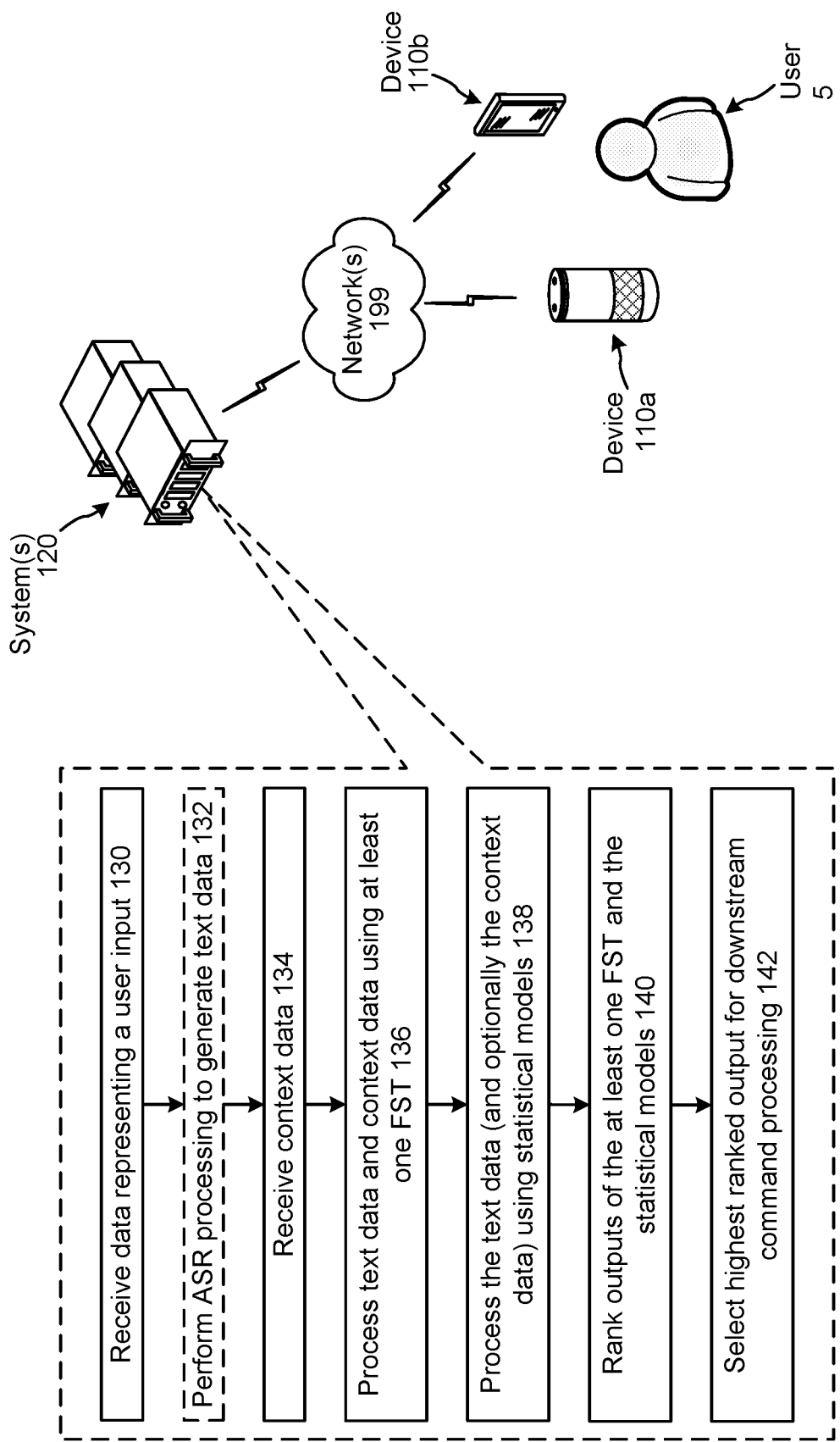
FIG. 1 illustrates a system configured to process user inputs according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions in response to user inputs. For example, for the user input of "Alexa, play Adele music," a system may output music sung by an artist named Adele. For further example, for the user input of "Alexa, what is the weather," a system may output synthesized speech representing weather information for a geographic location of the user.

A system may receive spoken user inputs and perform speech processing as part of determining an action that should be performed. A system may perform ASR processing on audio data (representing the spoken user input) to generate text data, and may perform NLU processing on the text data to determine an intent of the user input as well as entities represented in the user input.

NLU processing may include various techniques for determining the intent and one or more entities that may be used to process the intent. NLU processing may use one or more finite state transducers (FSTs) to convert input text data to an intent interpretation that may represent one or more entities, for example. An FST is a data structure that may include grammars representing user inputs as paths that may be traversed during NLU processing. The FST may include data corresponding to many different potential NLU outputs that the system may determine as a result of particular input text data. During runtime the system may use the input text data to determine a path through the FST (i.e., traverse the FST) to determine a set of nodes most likely to correspond to the input text data.

NLU processing may also include one or more statistical models configured to perform intent classification, named entity recognition, domain classification, and the like. Intent classification refers to determining an intent that most likely corresponds to the user input. Named entity recognition refers to identifying and labeling portions of a user input that may correspond to an entity (e.g., person, place, thing, etc.). Domain classification refers to determining a likelihood that the user input corresponds to a particular domain. As used herein, a "domain" may refer to a grouping of related functionality provided by a system post-NLU processing, non-limiting examples of which include finance, health, media, telecommunications, education, government, smart home, etc.

Different domains may desire to use the same or similar user input to trigger different functionality. For example, a smart home domain may want to use the user input "60 seconds" to perform a 60 second cooking operation using a smart device, whereas a timer domain may want to use the user input "60 seconds" to cause a timer to be set for 60 seconds.

At least some systems may require domains to negotiate regarding which domain gets to use a particular user input. Using the above as an example, the smart home domain and the timer domain may need to negotiate which domain gets to use the user input "60 seconds" to trigger that domain. Such negotiations may be common for a multi-domain system that is capable of executing commands related to many different areas. Such negotiations, however, may increase latency.

Teachings of the present disclosure decrease latency by pre-configuring FSTs to include and account for context information. According to the present disclosure, different domains may use the same or similar user input to trigger different functionality based on the context needed to trigger the respective functionality. For example, a smart home domain may include a smart home FST having a path that represents the user input "60 seconds" along with context information representing a smart home device received the user input (and, for example, the smart home device that should be triggered for the 60 seconds). For further example, a timer domain may include a timer FST having a path that represents the user input "60 seconds" along with context information representing a non-smart home device located in a kitchen of a building received the user input. The use of context information at the FST level reduces the need for domains to negotiate as different domains may use the same user input in view of different context information. By building contextual information into an FST the system may account for different domain operations in the same FST rather than having a different FST for each domain, in some examples.

Some systems may implement one or more FSTs in the first instance and only implement one or more statistical models if the system determines the user input does not correspond to the one or more FSTs. In other words, if processing the user input with the FST indicates gets an answer, the FST output may be used for downstream processing without necessarily processing the user input using the statistical model(s).

The present disclosure improves such systems by processing a given user input using both FST(s) and statistical model(s) regardless of the output of the FST(s). The respective outputs of the FST(s) and statistical model(s) may then be input to a reranker that determines a most likely interpretation of the user input. Such an implementation reduces situations where an FST(s) produces an interpretation and a statistical model(s) would have produced a better interpretation, yet the statistical model(s) was not run because the system was configured to run the statistical model(s) only if the FST(s) did not produce at least one sufficiently valid interpretation.

A system implementing the present disclosure may require user permission to perform the teachings herein. That is, a system may require a user opt in, with informed consent, prior to the system being able to implement the teachings herein with respect to one or more users of a device(s). Such requirement of informed consent ensures, in at least some instances, that a system implementing the present disclosure complies with laws, regulations, standards, and the like governing where the system and/or device(s) are located. Such requirement also assists in maintaining transparency with users of the system regarding how their information is used.

FIG. 1 illustrates a system configured to process user inputs. Although the figures and discussion illustrate certain operational steps of the system in a particular order, the steps described may be performed in a different order (as well as certain steps removed or added) without departing from the intent of the disclosure. As illustrated in FIG. 1, the system may include one or more devices (110a/110b), local to a user 5, connected to one or more systems 120 across one or more networks 199.

The device 110a may receive audio representing a spoken user input. The device 110a may generate audio data representing the audio and may send the audio data to the system(s) 120, which the system(s) 120 receives (130). The device 110b may receive a text-based user input via a graphical user interface (GUI). The device 110b may generate text data representing the text-based user input and may send the text data to the system(s) 120, which the system(s) 120 receives (130). The device(s) (110a/110b) may send the audio and/or text data to the system(s) 120 via a companion application installed on the device(s) (110a/110b). A companion application may enable a device 110 to communicate with the system(s) 120 via the network(s) 199. An example companion application is the Amazon Alexa application that may be installed on the smart phone, tablet, or the like.

If the system(s) 120 receives audio data, the system(s) 120 may perform (132) ASR processing on the audio data to generate text data representing the user input. The system(s) 120 may receive (134) context data representing a context surrounding the user input. Non-limiting examples of context data include the type of device 110 that received the user input, a time of day, whether a specific type of button was activated on the device 110 that received the user input, information representing previous turns of present dialog, etc.

As used herein, a "dialog," "dialog session," "session," or the like refers to related user inputs and system(s) 120 outputs. Related user inputs and system outputs may correspond to an ongoing exchange between a user 5 and the system(s) 120. When the system(s) 120 receives a user input, the system(s) 120 may associate the data (e.g., audio data or text data) representing the user input with a session identifier. The session identifier may be associated with various data (e.g., ASR results data, NLU results data, etc.) related to processing of the user input. When the system(s) 120 invokes a component (e.g., a skill as described below) to perform an action responsive to the user input, the system(s) 120 may send the session identifier to the component in addition to NLU results data. If the component outputs data for presentment to the user 5, the component may associate the data with the session identifier. The foregoing is illustrative and, thus, one skilled in the art will appreciate that a session identifier may be used to track data transmitted between various components of the system(s) 120.

The system(s) 120 may perform NLU processing on text data (e.g., received from the device 110b or generated by ASR processing) using the context data. As part of NLU processing, the system(s) 120 may process (136) the text data and context data using at least one FST. As part of NLU processing, the system(s) 120 may also or alternatively process (138) the text data (and optionally context data) using one or more statistical models (e.g., intent classification models, named entity recognition models, and domain classification models). The system(s) 120 may rank (140) outputs of the at least one FST and the statistical model(s) and may select (142) the highest ranked output for downstream command processing.

Figure 2:
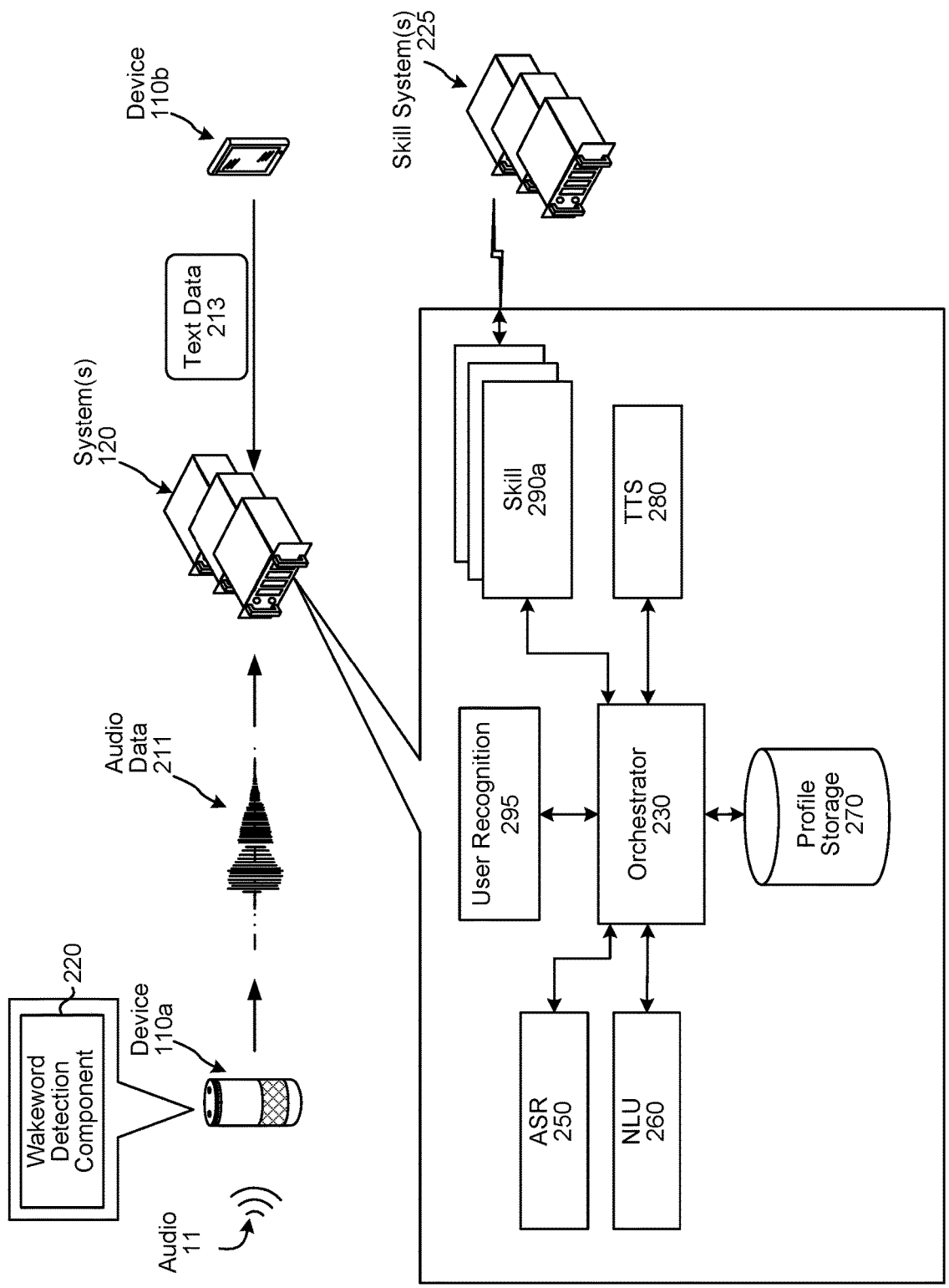
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the system(s) 120. The audio data 211 may include data corresponding to the wakeword, or the device 110*a* may remove the portion of the audio corresponding to the wakeword prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an N-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 213 representing the text-based user input. The device 110*a* may send the text data 213 to the system(s) 120. Upon receipt by the system(s) 120, the text data 213 may be sent to the orchestrator component 230. The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
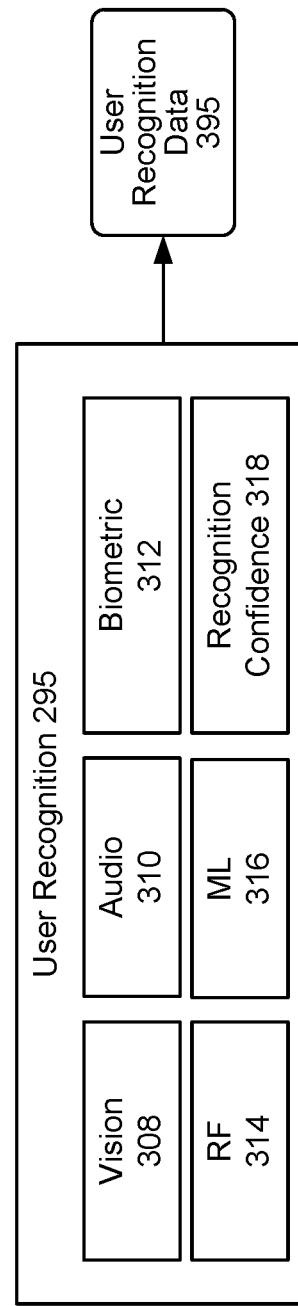
FIG. 3 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

Figure 4:
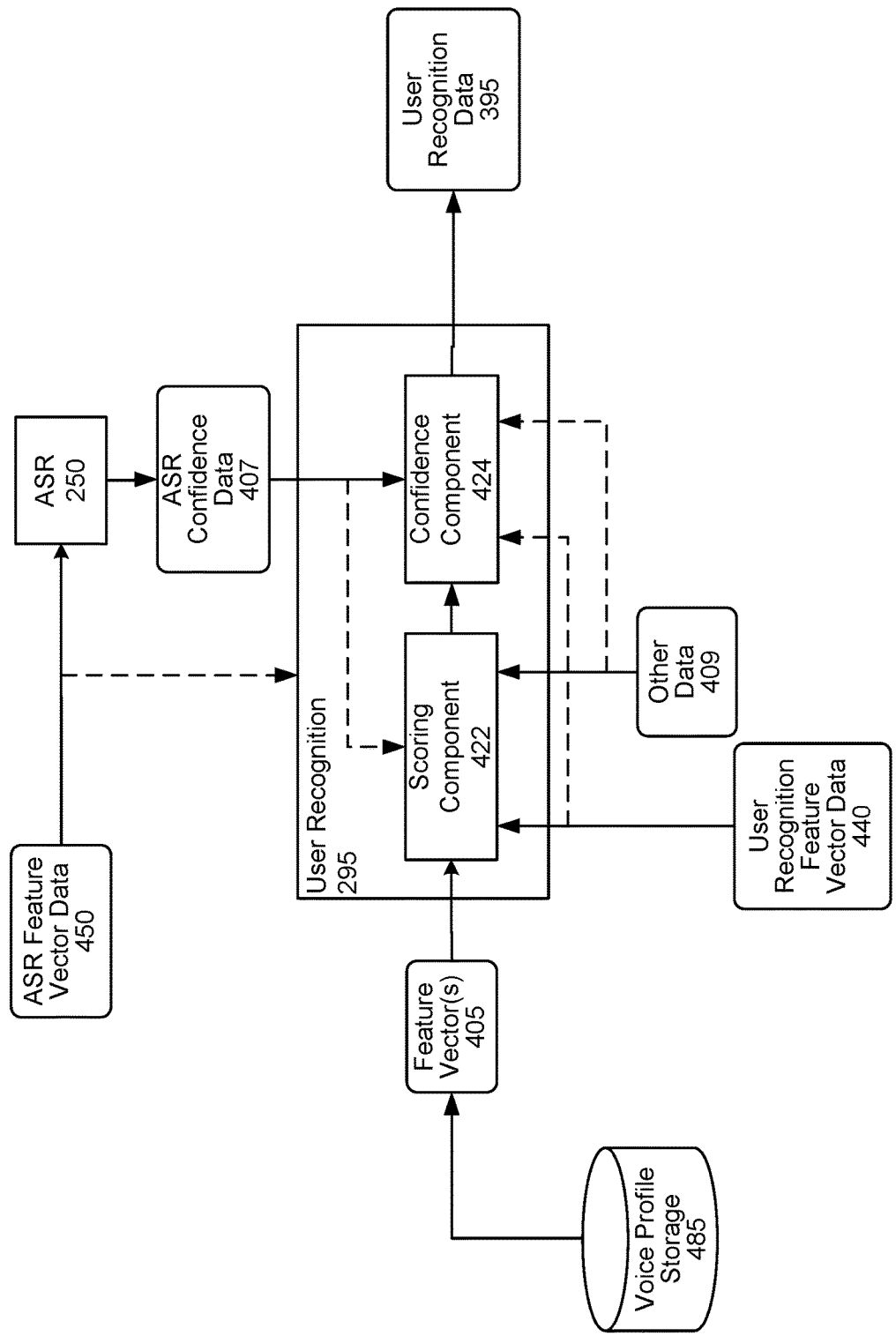
FIG. 4 is a system flow diagram illustrating user recognition according to embodiments of the present disclosure.

FIG. 4 illustrates user recognition processing as may be performed by the user recognition component 295. The ASR component 250 performs ASR processing on ASR feature vector data 450. ASR confidence data 407 may be passed to the user recognition component 295.

The user recognition component 295 performs user recognition using various data including the user recognition feature vector data 440, feature vectors 405 representing voice profiles of users of the system(s) 120, the ASR confidence data 407, and other data 409. The user recognition component 295 may output the user recognition data 395, which reflects a certain confidence that the user input was spoken by one or more particular users. The user recognition data 395 may include one or more user identifiers (e.g., corresponding to one or more voice profiles). Each user identifier in the user recognition data 395 may be associated with a respective confidence value, representing a likelihood that the user input corresponds to the user identifier. A confidence value may be a numeric or binned value.

The feature vector(s) 405 input to the user recognition component 295 may correspond to one or more voice profiles. The user recognition component 295 may use the feature vector(s) 405 to compare against the user recognition feature vector 440, representing the present user input, to determine whether the user recognition feature vector 440 corresponds to one or more of the feature vectors 405 of the voice profiles. Each feature vector 405 may be the same size as the user recognition feature vector 440.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 440 produced from the audio data 211. The user recognition component 295 may send a signal to voice profile storage 485, with the signal requesting only audio data and/or feature vectors 405 (depending on whether audio data and/or corresponding feature vectors are stored) associated with the device identifier, the group profile identifier, and/or the user identifiers represented in the metadata. This limits the universe of possible feature vectors 405 the user recognition component 295 considers at runtime and thus decreases the amount of time to perform user recognition processing by decreasing the amount of feature vectors 405 needed to be processed. Alternatively, the user recognition component 295 may access all (or some other subset of) the audio data and/or feature vectors 405 available to the user recognition component 295. However, accessing all audio data and/or feature vectors 405 will likely increase the amount of time needed to perform user recognition processing based on the magnitude of audio data and/or feature vectors 405 to be processed.

If the user recognition component 295 receives audio data from the voice profile storage 485, the user recognition component 295 may generate one or more feature vectors 405 corresponding to the received audio data.

The user recognition component 295 may attempt to identify the user that spoke the speech represented in the audio data 211 by comparing the user recognition feature vector 440 to the feature vector(s) 405. The user recognition component 295 may include a scoring component 422 that determines respective scores indicating whether the user input (represented by the user recognition feature vector 440) was spoken by one or more particular users (represented by the feature vector(s) 405). The user recognition component 295 may also include a confidence component 424 that determines an overall accuracy of user recognition processing (such as those of the scoring component 422) and/or an individual confidence value with respect to each user potentially identified by the scoring component 422. The output from the scoring component 422 may include a different confidence value for each received feature vector 405. For example, the output may include a first confidence value for a first feature vector 405a (representing a first voice profile), a second confidence value for a second feature vector 405b (representing a second voice profile), etc. Although illustrated as two separate components, the scoring component 422 and the confidence component 424 may be combined into a single component or may be separated into more than two components.

The scoring component 422 and the confidence component 424 may implement one or more trained machine learning models (such as neural networks, classifiers, etc.) as known in the art. For example, the scoring component 422 may use probabilistic linear discriminant analysis (PLDA) techniques. PLDA scoring determines how likely it is that the user recognition feature vector 440 corresponds to a particular feature vector 405. The PLDA scoring may generate a confidence value for each feature vector 405 considered and may output a list of confidence values associated with respective user identifiers. The scoring component 422 may also use other techniques, such as GMMs, generative Bayesian models, or the like, to determine confidence values.

The confidence component 424 may input various data including information about the ASR confidence 407, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 424 may also consider the confidence values and associated identifiers output by the scoring component 422. For example, the confidence component 424 may determine that a lower ASR confidence 407, or poor audio quality, or other factors, may result in a lower confidence of the user recognition component 295. Whereas a higher ASR confidence 407, or better audio quality, or other factors, may result in a higher confidence of the user recognition component 295. Precise determination of the confidence may depend on configuration and training of the confidence component 424 and the model(s) implemented thereby. The confidence component 424 may operate using a number of different machine learning models/techniques such as GMM, neural networks, etc. For example, the confidence component 424 may be a classifier configured to map a score output by the scoring component 422 to a confidence value.

The user recognition component 295 may output user recognition data 395 specific to a one or more user identifiers. For example, the user recognition component 295 may output user recognition data 395 with respect to each received feature vector 405. The user recognition data 395 may include numeric confidence values (e.g., 0.0-1.0, 0-1000, or whatever scale the system is configured to operate). Thus, the user recognition data 395 may output an N-best list of potential users with numeric confidence values (e.g., user identifier 123-0.2, user identifier 234-0.8). Alternatively or in addition, the user recognition data 395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an N-best list of user identifiers with binned confidence values (e.g., user identifier 123-low, user identifier 234-high). Combined binned and numeric confidence value outputs are also possible. Rather than a list of identifiers and their respective confidence values, the user recognition data 395 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 424 may determine the overall confidence value.

The confidence component 424 may determine differences between individual confidence values when determining the user recognition data 395. For example, if a difference between a first confidence value and a second confidence value is large, and the first confidence value is above a threshold confidence value, then the user recognition component 295 is able to recognize a first user (associated with the feature vector 405 associated with the first confidence value) as the user that spoke the user input with a higher confidence than if the difference between the confidence values were smaller.

The user recognition component 295 may perform thresholding to avoid incorrect user recognition data 395 being output. For example, the user recognition component 295 may compare a confidence value output by the confidence component 424 to a threshold confidence value. If the confidence value does not satisfy (e.g., does not meet or exceed) the threshold confidence value, the user recognition component 295 may not output user recognition data 395, or may only include in that data 395 an indicator that a user that spoke the user input could not be recognized. Further, the user recognition component 295 may not output user recognition data 395 until enough user recognition feature vector data 440 is accumulated and processed to verify a user above a threshold confidence value. Thus, the user recognition component 295 may wait until a sufficient threshold quantity of audio data of the user input has been processed before outputting user recognition data 395. The quantity of received audio data may also be considered by the confidence component 424.

The user recognition component 295 may be defaulted to output binned (e.g., low, medium, high) user recognition confidence values. However, such may be problematic in certain situations. For example, if the user recognition component 295 computes a single binned confidence value for multiple feature vectors 405, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 409 to inform user recognition processing. A trained model(s) or other component of the user recognition component 295 may be trained to take other data 409 as an input feature when performing user recognition processing. Other data 409 may include a variety of data types depending on system configuration and may be made available from other sensors, devices, or storage. The other data 409 may include a time of day at which the audio data 211 was generated by the device 110 or received from the device 110, a day of a week in which the audio data audio data 211 was generated by the device 110 or received from the device 110, etc.

The other data 409 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 440 and one or more feature vectors 405 to perform more accurate user recognition processing.

The other data 409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 409 may include data representing activity of a particular user that may be useful in performing user recognition processing. For example, a user may have recently entered a code to disable a home security alarm. A device 110, represented in a group profile associated with the home, may have generated the audio data 211. The other data 409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 409 and considered by the user recognition component 295.

Depending on system configuration, the other data 409 may be configured to be included in the user recognition feature vector data 440 so that all the data relating to the user input to be processed by the scoring component 422 may be included in a single feature vector. Alternatively, the other data 409 may be reflected in one or more different data structures to be processed by the scoring component 422.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
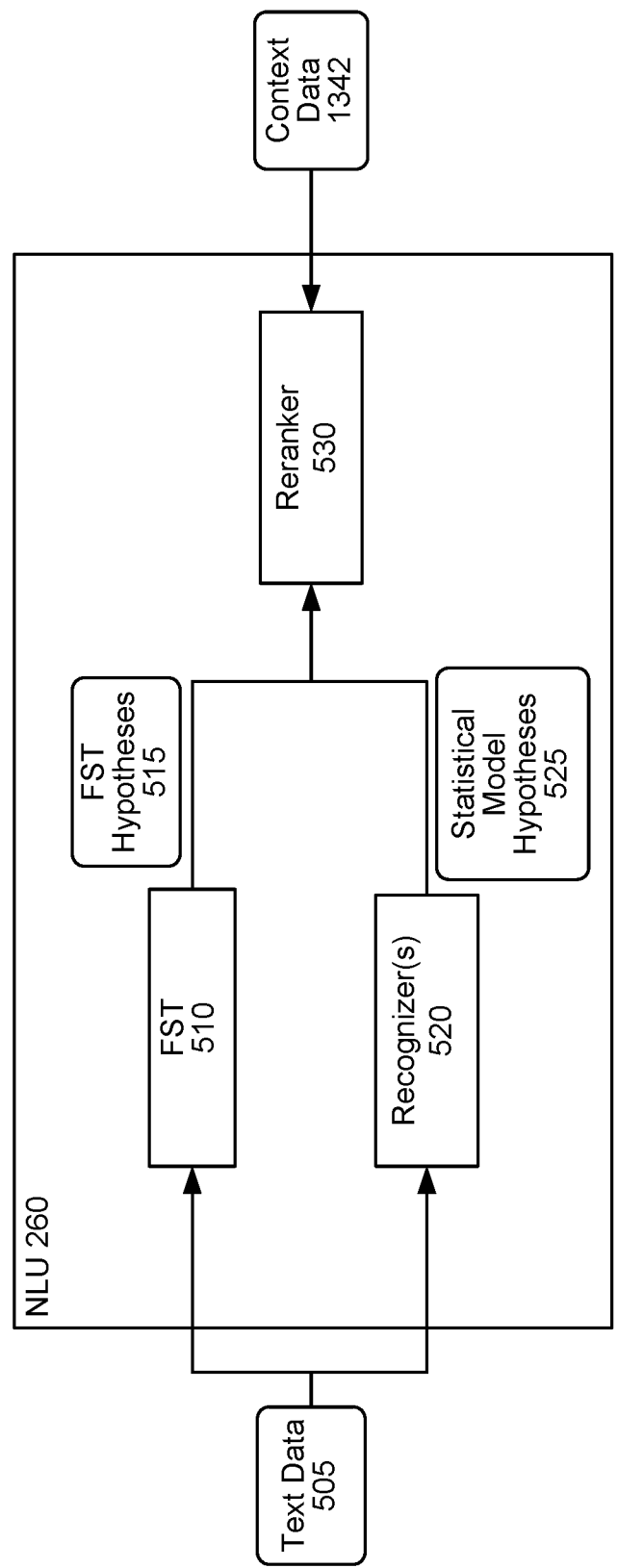
FIG. 5 is a conceptual diagram of how NLU processing may be performed according to embodiments of the present disclosure.

The NLU component 260 may process text data 505 (e.g., ASR hypotheses or text data received from a device 110) input thereto using an FST component 510 and one or more statistical models (referred to as recognizers 520 herein) (as illustrated in FIG. 5). The FST component 510 may use text data and context data to traverse one or more paths of one or more FSTs. The FST component 510 and the recognizer(s) 520 may be used during a recognition portion of NLU processing. That is, the FST component 510 and the recognizer(s) 520 may be used to generate intent interpretations from a user input. FSTs are data structures capable of recognizing user inputs that conform to pre-defined grammars. That is, FSTs may be used to recognize frequent, unambiguous user inputs. In contrast, recognizers 520 may be better suited for recognizing a wider range of user inputs that may diverge from expected patterns The FST component 510 may output one or more FST hypotheses 515 (sometimes referred to as an N-best list), with each FST hypothesis of the list representing a different successfully traversed path of the FST(s). The recognizer(s) 520 may generate an N-best list of one or more statistical model hypotheses 525. The one or more FST hypotheses 515 and the one or more statistical model hypotheses 525 (which collectively may include individual examples of NLU output data) may be input to a reranker 530. The reranker 530 may be configured to rerank the ranked hypotheses input thereto to generate an ordered list of both FST component-generated and recognizer-generated hypotheses. That is, the reranker 530 may be configured to input each respective hypothesis, its respective score, and additional data (such as context data or the like) to create a new score for each hypothesis and then rank the FST hypotheses 515 and the statistical model hypotheses 525 using the new scores. The reranker 530 may receive various context data 1342 as described below.

Figure 6:
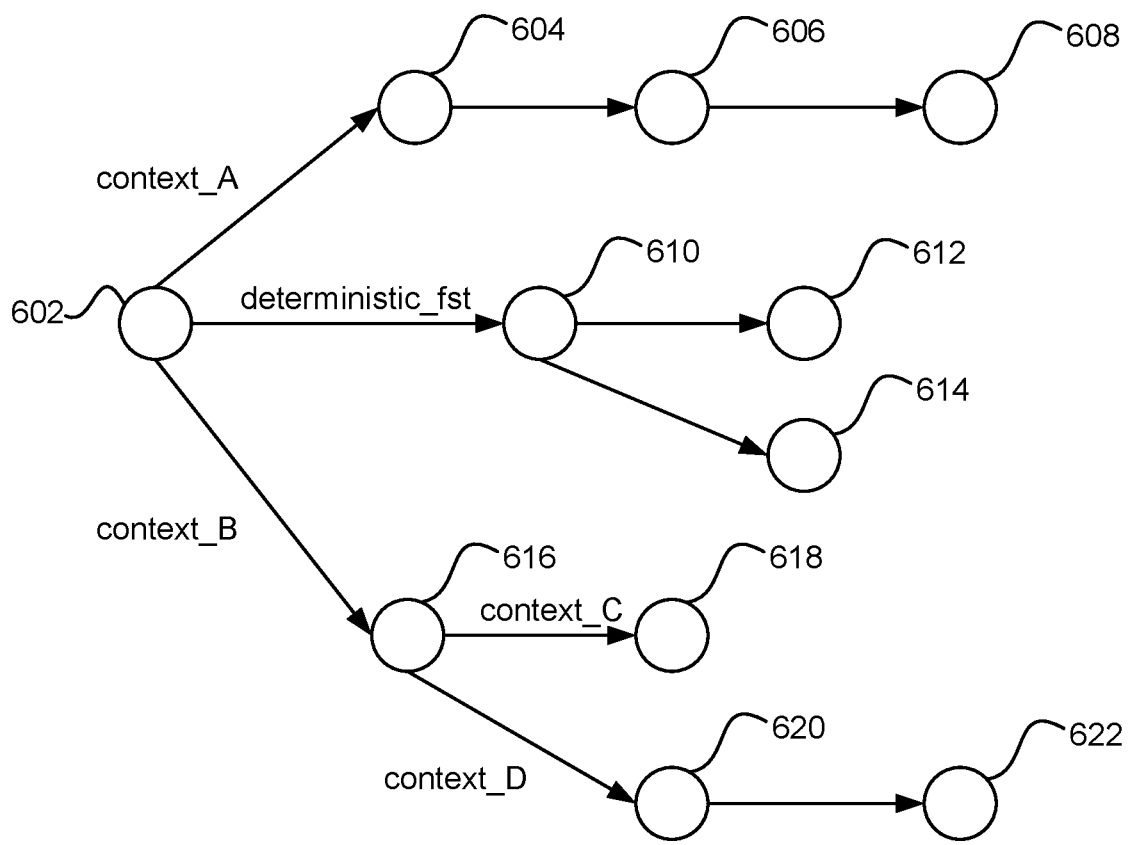
FIG. 6 is a conceptual diagram of an example context-based FST according to embodiments of the present disclosure.

FSTs may be designed to incorporate context information (as illustrated in FIG. 6). As shown, an FST may include a node 602 that branches into three different paths. A first branch may be associated with first context information (denoted context_A in FIG. 6), a second branch may be associated with second context information (denoted context_B in FIG. 6), and a third branch may be associated with neither the first context information nor the second context information (labeled "deterministic_fst in FIG. 6). The "deterministic_fst" indicator may, in at least some examples, represent the path corresponding thereto is to be ranked higher than other paths by the reranker 530. The second path, corresponding to context_B, may include a node 604 that further splits into two different paths associated with context_C and context_D respectively. Example types of context information include a type of device 110 that received the user input, input/output capabilities of the device 110 that received the user input, a time of day, location information, user age information, whether a button of a device 110 was activated when the device 110 received the user input, information representing previous turns of a dialog to which the user input corresponds (e.g., intent indicator of a previous turn, NER slots of a previous turn, etc.), device status information (e.g., representing whether a device is presently displaying content and/or presently outputting audio), etc.

As illustrated, nodes 602, 604, 606, and 608 may correspond to a first user input; nodes 602, 610, and 612 may correspond to a second user input; nodes 602, 610, and 614 may correspond to a third user input; nodes 602, 616, and 618 may correspond to a fourth user input; and nodes 602, 616, 620, and 622 may corresponding to a fifth user input. Nodes 604, 616, 618, and 620 may correspond to different context information. Nodes 606, 608, 610, 612, 614, and 622 may correspond to different entities (e.g., persons, places, things that may correspond to NER slots as described below) of the user inputs to which they correspond.

An FST, such as that illustrated in FIG. 6, may be specific to a domain, skill, or the like. An FST may also or alternatively be built specific to a user identifier (e.g., specific to a user). Each user may be associated with different types of context information (e.g., a user's identifier may be associated with particular kinds of devices). It may be unbeneficial to generate an FST that matches data from all users of the system(s) 120 because not all context information available to the system is applicable to every user. For example, rather than generating a generic smart home domain FST, the system may, in at least some embodiments, generate a smart home FST specific to a particular user (e.g., that accounts for context information specific to a particular user's smart home devices). A user-specific FST may be used to process user inputs associated with the user's identifier at runtime, rather than user inputs associated with other users' identifiers. Such may provide higher FST precision at runtime.

Figure 7:
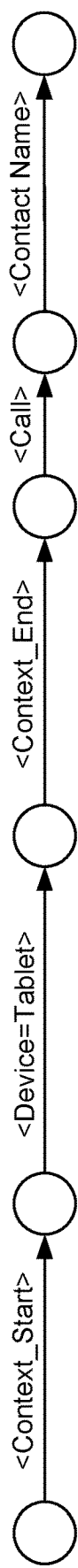
FIG. 7 is a conceptual diagram of an example path through a context-based FST according to embodiments of the present disclosure.

For illustration, FIG. 7 shows an example path through a contex-based FST for a user input requesting the system(s) 102 establish a two-way communication with a recipient. As illustrated, the FST component 510 may, at runtime, use text data representing a user input to traverse a path of an FST if the device 110 that received the user input is a tablet, if the user input includes the word "call," and if the user input includes a contact name. One skilled in the art will understand how to construct various FSTs using the FSTs illustrated in FIGS. 6 and 7 as examples.

FIGS. 6 and 7 illustrate context information corresponding to the beginning portions of FST paths. Such configuration may enable context information to act as filters for the FST paths. That is, an FST path may not be traversed, at all, if context information associated with the path is not present.

Nonetheless, one skilled in the art will appreciate that context information may be configured at different portions of FST paths.

The system(s) 120 may include an aggregator component 810 that aggregates context information from various sources. The aggregator component 810 may include a load balancer 820 and various computing resources 830 (as illustrated in FIG. 8).

The aggregator component 810 may receive numerous queries for context information at any given moment. The plurality of computing resources 830 (e.g., hosts) may provide the aggregator component 810 with enough computing power to handle such queries in a timely manner. The load balancer 820 is configured to distribute workloads across the computing resources 830, to ensure processing of a query is not unnecessarily delayed due to high system load.

While the aggregator component 810 may primarily aggregate context information at runtime, the aggregator component 810 may secondarily store context information that is not stored in storage by some other component of the system. For example, the aggregator component 810 may store information generated by the system for a user input, such as ASR hypotheses, NLU results, a global positioning system (GPS) location of the device 110 from which the user input was received, data representing a service (or other system component) having control of content presented on a display of a device 110, etc.

Figure 8:
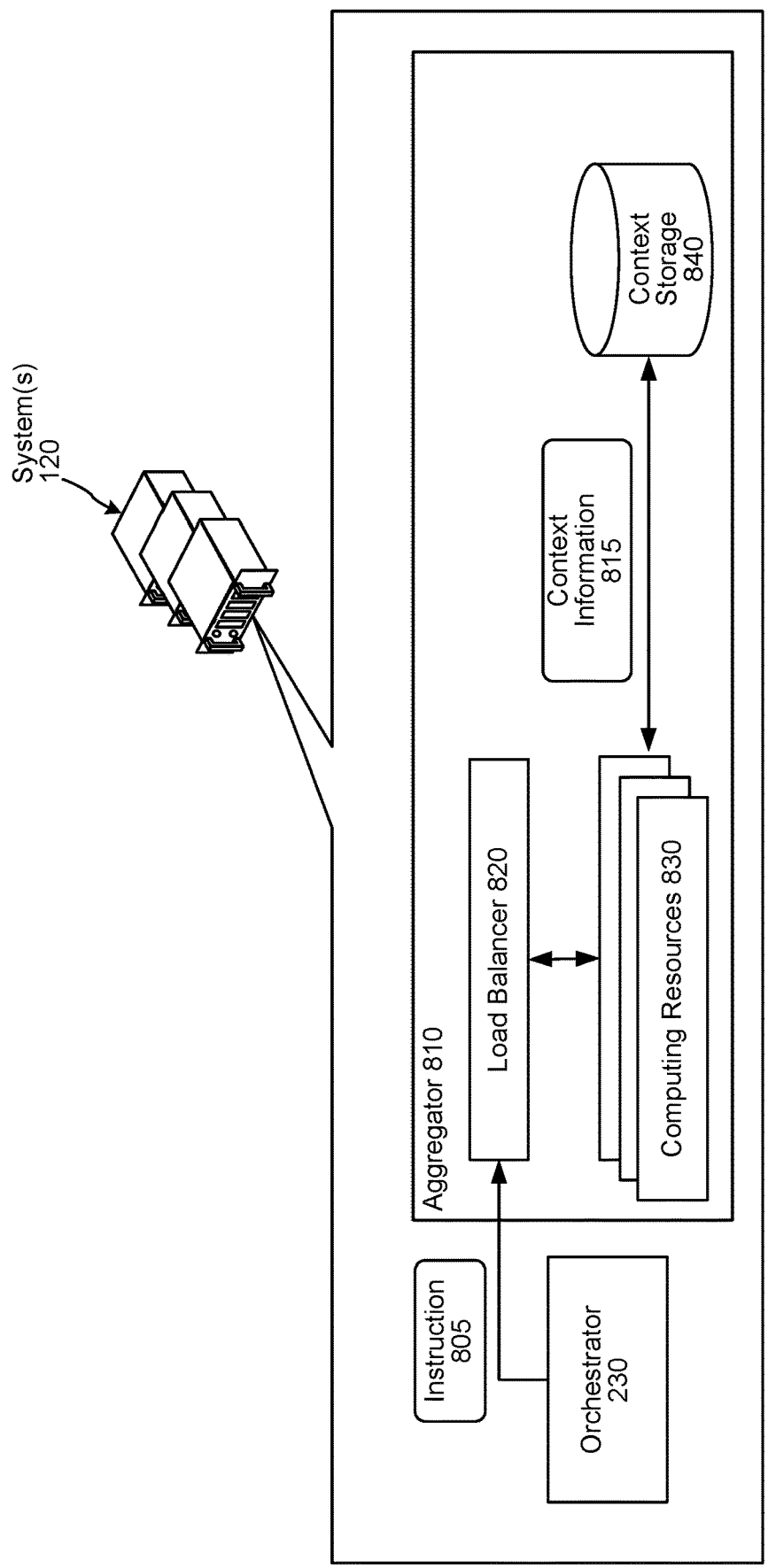
FIG. 8 is a conceptual diagram illustrating how context information may be stored in response to an instruction to store context information according to embodiments of the present disclosure.

FIG. 8 illustrates how the aggregator component 810 may store context information in response to an instruction 805 to store context information. The orchestrator component 230 (or some other component of the system) may send, to the aggregator component 810, the instruction 805 via a particular application program interface (API) of the aggregator component 810. The instruction 805 may include context information to be stored by the aggregator component 810, as well as various parameters (e.g., user identifier, device identifier, user input identifier, etc.) associated with the context information.

The load balancer 820 assigns the instruction 805 to one or more of the computing resources 830. The one or more computing resources 830 process the instruction 805 to determine the context information 815 represented therein, and thereafter store the context information 815 in context storage 840.

The storing of context information, as described with respect to FIG. 8, may occur more than once with respect to a single user input. For example, first context information for a user input may be stored in the context storage 840 after the user input is received but prior to ASR processing being performed (whereby such context information may represent a device identifier of the device that captured the user input, a type of the device, what account the device belongs to, etc.); second context information for the user input may be stored in the context storage 840 after ASR processing is performed but prior to NLU processing being performed; third context information for the user input may be stored in the context storage 840 after NLU processing is performed but prior to a skill being invoked, etc. As such, one skilled in the art will appreciate that context storage 840 may be updated (one or more times) for a given user input as the system learns more context information from processing performed with respect to the user input.

In addition to receiving instructions to store context information from the orchestrator component 230 (or another component of the system), the aggregator component 810 may receive context information queries from the orchestrator component 230 (or another component of the system). Whereas an instruction to store context information results in context information being stored by the aggregator component 810, a context information query requests context information from the aggregator component 810.

Figure 9:
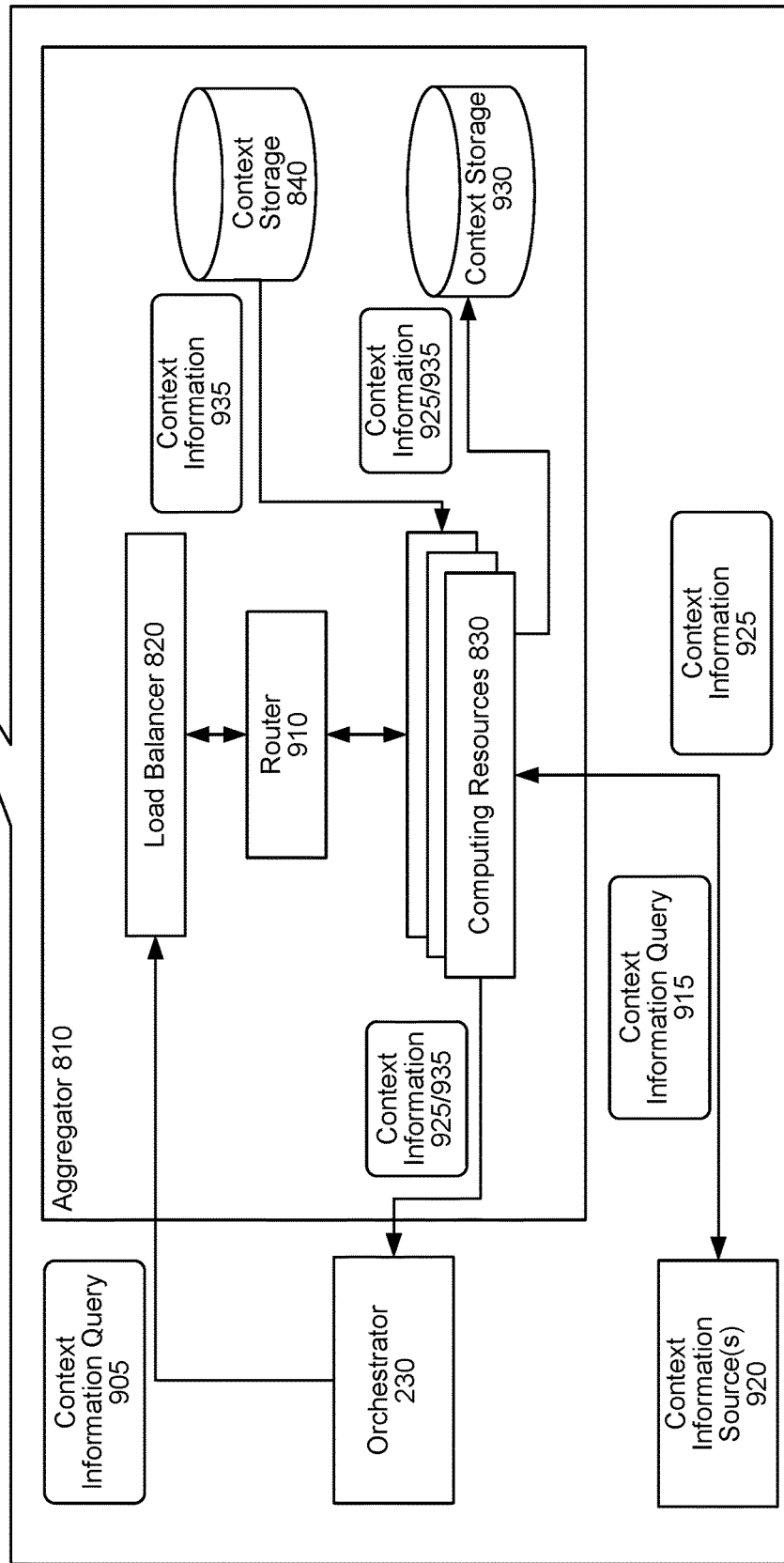
FIG. 9 is a conceptual diagram illustrating components for aggregating context information in response to a context information query according to embodiments of the present disclosure.

FIG. 9 illustrates how the aggregator component 810 may process a context information query 905 requesting context information. The context information query 905 may be sent to the load balancer 820. The load balancer 820 may assign the context information query 905 to one or more computing resources 830 based on a present load of the computing resources 830.

The aggregator component 810 may receive multiple context information queries associated with the same entity. Moreover, more than one of these context information queries may be received by the aggregator component 810 between a time when one or more computing resources 830 are called to process one of the context information queries and when the one or more computing resources 830 outputs the requested context information. The aggregator component 810 may include a router 910 that acts as a secondary load balancer to the load balancer 820. That is, the router 910 may determine one or more computing resources 830 are currently processing to aggregate context information requested by the context information query 905. If none of the computing resources 830 are currently processing as such, the router 910 may let the load balancer 820's assignment stand. Conversely, if the router 910 determines one or more computing resources 830 are currently aggregating the requested context information, the router 910 may reassign the context information query 905 to those one or more computing resources 830. The foregoing decisions of the router 910 may be based on job statuses associated with processes performed by one or more computing resources 830. This prevents the computing resources 830 from duplicating queries to the same context information source(s), for the same context information (e.g., thereby decreasing load on downstream context information sources). Moreover, as a result of such reassignment, the computing resources 830 are able to output context information, in response to multiple context information queries, even if processing for one context information query began prior to receipt of a second context information query requesting the same context information. As a result, context information may be provided to the source of the second context information query faster than if the computing resources 830 separately called one or more context information sources in response to the second context information query.

The one or more computing resources 830 may determine at least one context information source 920 to query for the requested context information. The context information source(s) 920 may have access to various types of context information including, for example, information representing which users of the system are subscribed to one or more pay-for services of the system, information representing IP addresses associated with devices from which user inputs were received, information representing electronic calendar events, information representing types of music a particular user has listened to over a previous amount of time (e.g., the last 30 days), demographic information of system users (e.g., birthdate, gender, education, etc. as represented in user profiles), etc. In general, the context information source(s) 920 may provide context information that may be used by various components of the system (including but not limited to the FSTs 510) in performing their respective processes. A context information source 920 may be a storage containing context information, or may be a computer processing component in communication with such a storage. While FIG. 9 illustrates the context information source(s) 920 being implemented by the system(s) 120, one skilled in the art will appreciate that some or all of the context information source(s) 920 may not be implemented by, but may be in communication with, the system(s) 120.

The one or more computing resources 830 may send a context information query 915 to each determined context information source 920. The context information query 915 may represent one or more device identifiers, one or more user identifiers, one or more user input identifiers, etc. The one or more computing resources 830 may receive context information 925, from each queried context information source 920, that is associated with the device identifier(s), user identifier(s), user input identifier(s), etc.

The one or more computing resources 830 may also query the context storage 840 for context information 935 stored in the context storage 840 in response to an instruction to store context information (as described above with respect to FIG. 8). The one or more computing resources 830 may query context storage 840 with respect to the same identifier(s) that the one or more computing resources 840 send to the context information source(s) 920.

The one or more computing resources 830 store the context information (925/935) in context storage 930. The context information stored in the context storage 930 may represent a source (e.g., a context information source) from which the context information was received, one or more identifiers of the one or more computing resources 830 used to obtain the context information, a type of the context information, etc. While it has been illustrated and described that proactively stored context information is stored in the context storage 840 and context information, aggregated in response to a context information query 905, is stored in the context storage 930, a same storage for both types of context information may be used in at least some embodiments.

The one or more computing resources 830 may send the context information (925/935) to the component(s) of the system that originated context information queries requesting the context information. In some examples, the one or more computing resources 830 may send the context information (925/935) to the orchestrator component 230, which may route the context information (925/935) to the system components that requested the information. The context information (925/935) may be sent to the system component that sent the context information query 905. The context information (925/935) may be sent to one or more system components that sent context information queries (requesting the same or similar context information as the context information query 905) after the context information query 905 was received, but prior to the context information (925/935) being reassigned by the router 910.

The aggregation of context information, as described with respect to FIG. 9, may occur more than once with respect to a single user input. For example, the aggregator component 810 may receive a first query for context information to be used to perform ASR processing with respect to a user input, a second query for context information to be used to perform NLU processing with respect to the user input, a third query for context information to be used to select a skill to be invoked with respect to the user input, a fourth query for context information to be used by the skill to perform an action responsive to the user input, etc. For further example, the aggregator component 810 may receive a first query for context information to be used to perform NLU processing of a user input by a first NLU domain, a second query for context information to be used to perform NLU processing of the user input by a second NLU domain, etc.

In at least some example, the aggregator component 810 may associate received data with a corresponding user input identifier for later recall. For example, when the aggregator component 810 pre-fetches context information to be used for ASR processing, the aggregator component 810 may associate the context information with a corresponding user input identifier in storage. Thereafter, if the ASR component 250 requests context information for the user input identifier, the aggregator component 810 is able to recall the appropriate context information (e.g., the context information associated with the user input identifier) from storage. For further example, when the aggregator component 810 prefetches context information to be used for NLU processing, the aggregator component 810 may associate the context information with a corresponding user input identifier in storage. Thereafter, if the NLU component 260 requests context information for the user input identifier, the aggregator component 810 is able to recall the appropriate context information from storage. Other examples are possible.

The aggregator component 810 may receive queries for context information for different user inputs and for different stages of user input processing. The aggregator component 810 may also receive published events, such as those representing a user has recently enabled a skill. The aggregator component 810 may obtain context information when the aggregator component 810 anticipates context information may be used during processing of a user input. For example, in response to receiving a published event representing a user has recently enabled a skill, the aggregator component 810 may obtain context information that may be used by the skill to process a user input of the user.

Figure 10:
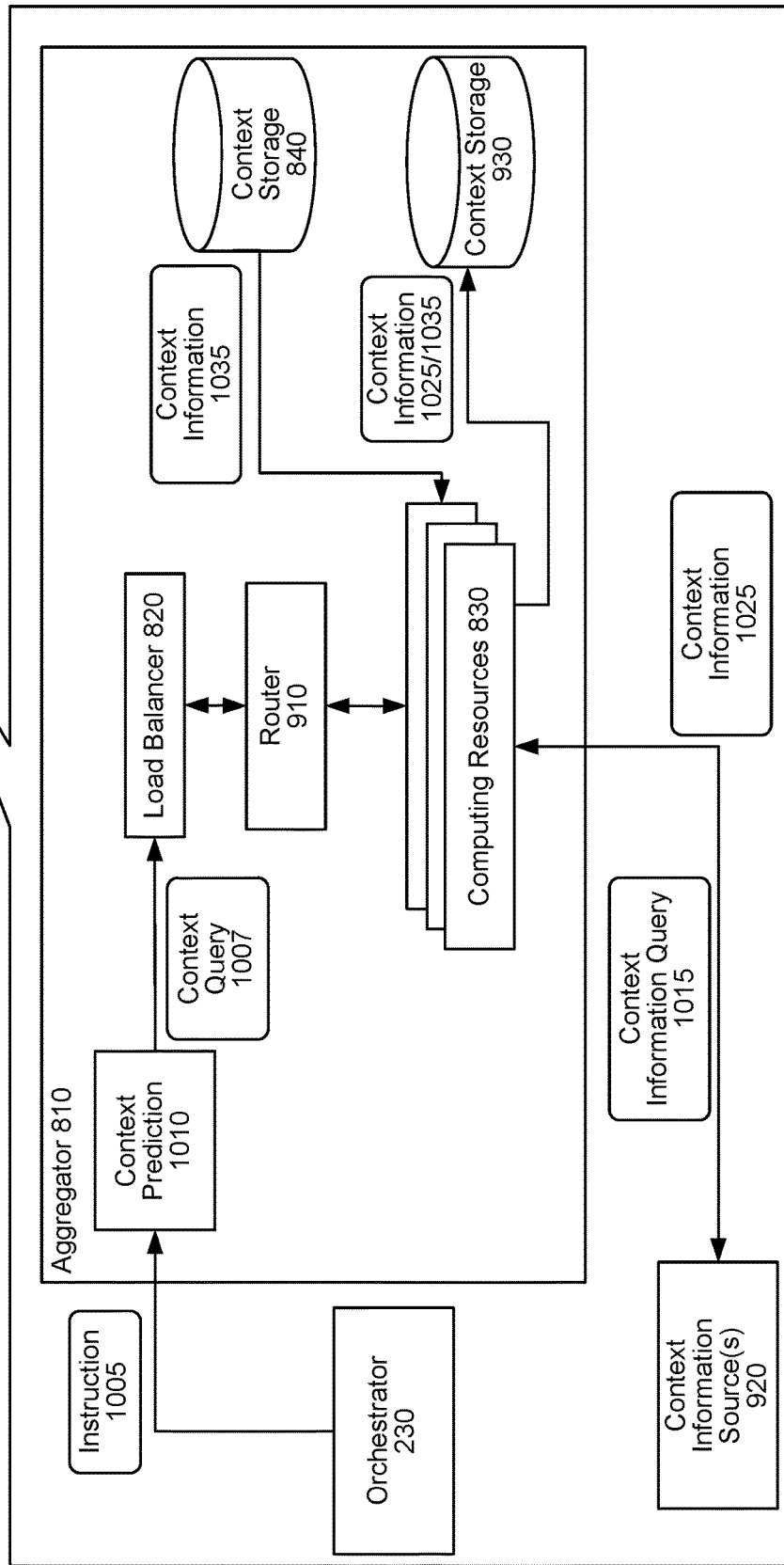
FIG. 10 is a conceptual diagram illustrating components for obtaining context information prior to receiving a context information query according to embodiments of the present disclosure.

FIG. 10 illustrates how the aggregator component 810 may obtain context information. The aggregator component 810 may include a context prediction component 1010. The context prediction component 1010 may be configured to receive all instructions to store context information sent to the aggregator component 810 and determine, for each instruction, whether it is likely that context information will be used to process a user input. For example, if the aggregator component 810 receives an instruction to store context information representing a new user input (e.g., including a device identifier, information representing a device type, and a user input identifier), the context prediction component 1010 may determine it is likely (e.g., may determine at least a minimum confidence) that context information will be used in ASR processing. In another example, if the aggregator component 810 receives an instruction to store context information representing ASR results, the context prediction component 1010 may determine it is likely (e.g., may determine at least a minimum confidence) that context information will be used in NLU processing (e.g., by at least one FST). In a further example, if the aggregator component 810 receives an instruction to store context information representing NLU results, the context prediction component 1010 may determine it is likely (e.g., may determine at least a minimum confidence) that context information will be used to select a particular skill to perform an action responsive to the user input. Other examples are possible.

The context prediction component 1010 may be configured with rules for analyzing instructions, to store context information, to determine what context information will be the subject of a subsequently received context information query, etc. For example, one or more rules may indicate that a user's age should be obtained when a new user input is represented in an instruction to store context information. For further example, one or more rules may indicate that a user's devices' output capabilities should be obtained when ASR results are represented in an instruction to store context information.

The context prediction component 1010 may be configured to implement one or more trained machine learning models for analyzing instructions, to store context information, to determine what context information will be the subject of a subsequently received context information query, etc. Over time, the system may gather data representing instructions to store context information and subsequently received context information queries. Offline, the system may use such data to train a machine learning model(s) to identify trends in content of instructions and content of subsequently received context information queries. The context prediction component 1010 may implement the trained machine learning model(s) at runtime to process an instruction, to store context information, to determine what context information will be the subject of a subsequently received context information query, etc.

The machine learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The context prediction component 1010 may generate a context query 1007. The context query 1007 may be generated based on system usage of a present user. For example, the context prediction component 1010 may receive an instruction 1005 to store context information for a user input associated with a particular user identifier, may identify a system usage history associated with the user identifier (e.g., the last N number of user inputs associated with the user identifier), and may determine (based on the system usage history) that the present user input will invoke certain domains of the NLU component. In this example, the context query 1007 may instruct downstream components to obtain context information to be used by the determined NLU domains. Other examples are possible.

The context prediction component 1010 sends the context query 1007 to the load balancer 820, which assigns the context query 1007 to one or more computing resources 830. The one or more computing resources 830 may send a context information query 1015 to each context information source 920 that the one or more computing resources 830 determines has context information corresponding to the context query 1007. The one or more computing resources 830 may receive context information 1025 from the one or more queried context information sources 920.

The one or more computing resources 830 may request, from context storage 84, context information 1035 associated with the context query 1007.

The one or more computing resources 830 may store the context information (1025/1035) in the context storage 930.

An instruction 1005 to store context information representing a new user input (e.g., representing a device identifier, a type of device, a user input identifier, etc.) may be sent to the aggregator component 810 upon the device 110 detecting a spoken wakeword, but prior to the user finishing speaking of the user input. One skilled in the art will appreciate that the operations for obtaining context information described with respect to FIG. 10 may be completed prior to the user finishing speaking of the user input. This significantly reduces computing latency experienced in processing of a subsequently received context information query.

A user input may be received as part of a dialog between a user and the system. A dialog may correspond to various user inputs and system outputs. When the system(s) 120 receives a user input, the system(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes the skill, the system may send the session identifier to the skill in addition to NLU results data. If the skills outputs data for presentment to the user, the skill may associate the data with the session identifier. The foregoing is illustrative and, thus, one skilled in the art will appreciate that a session identifier may be used to track data transmitted between various components of the system. A session identifier may be closed (e.g., a dialog between a user and the system may end) after a skill performs a requested action (e.g., after the skill causes content to be output to the user).

A user input, corresponding system processing, and system performance of an action responsive to the user input may be collectively referred to as a "turn." A single dialog may include multiple turns. The context information stored in context storage (840/930) may be stored across turns such that context information collected and used for a first turn may be recalled and used for a subsequent turn.

Figure 11:
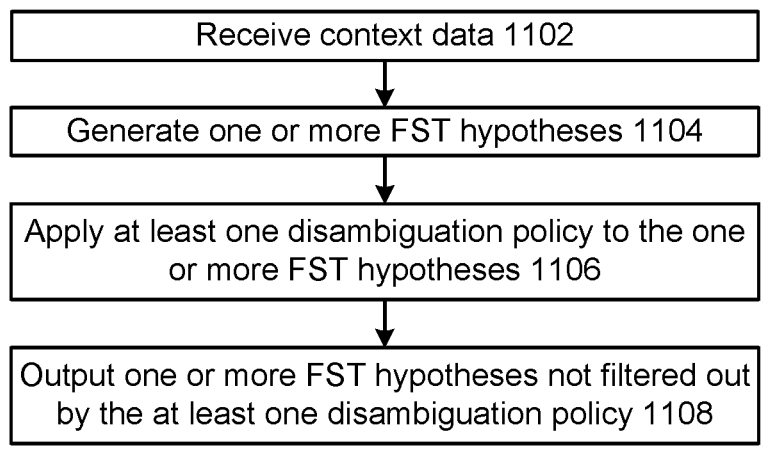
FIG. 11 is a process flow diagram illustrating how NLU processing using FSTs may be performed according to embodiments of the present disclosure.

As detailed above, the FST component 510 may traverse one or more paths of one or more FST at runtime to generate FST hypotheses 515. FIG. 11 illustrates an example of such processing. The FST component 510 may receive (1102) context data from the aggregator component 810. In an embodiment, the orchestrator component 230 (or another component of the system(s) 120 located upstream from the NLU component 260) may query the aggregator component 810 for context data that may be used to traverse one or more FST paths with respect to a present user input. In such an embodiment, the context data may be appended to the text data (representing the user input) that is input to the NLU component 260. In another embodiment, the FST component 510 may query the aggregator component 810 for such context data.

The FST component 510 may generate (1104) one or more FST hypotheses 515 using the text data and context data. A single FST hypothesis may correspond to an intent interpretation representing a traversed path of an FST. In at least some examples, a traversed path may match only the text data (e.g., may not require context information, such as that represented by nodes 610, 612, and 614 in FIG. 6). In at least some examples, a traversed path may match both the text data and context data.

Context data that is not explicitly referenced in an FST path may be optional. That is, the presence of context data that is not explicitly referenced in an FST path does not negate that path for purposes of that path being traversed with respect to the present user input.

An FST hypothesis may be associated with a value representing a likelihood that the traversed path corresponds to the text data (and optionally context data). In at least some examples, the FST component 510 may generate an n-best list of FST hypotheses.

The FST component 510 may apply (1106) at least one disambiguation policy to the one or more generated FST hypotheses. A disambiguation policy may cause the FST component 510 to not output FST hypotheses for downstream processing if more than one FST hypothesis is generated. Another disambiguation policy may cause the FST component 510 to output the highest scoring FST hypothesis for downstream processing. Another disambiguation policy may cause the FST component 510 to favor personalized FST hypotheses (e.g., FST hypotheses corresponding to FST paths that include context information) over global FST hypotheses (e.g., FST hypotheses corresponding to FST paths that do not include context information). Another disambiguation policy may cause the FST component 510 to favor FST hypotheses corresponding to FST paths that include certain types of context information over FST hypotheses corresponding to FST paths including other types of context information. Another disambiguation policy may cause the FST component 510 to favor FST hypotheses corresponding to FST paths including more types of context information over FST hypotheses corresponding to FST paths including less types of context information. Other disambiguation policies may be used.

The FST component 510 outputs (1108) one or more FST hypotheses 515 that are not filtered out by one or more disambiguation policies. An FST hypothesis may be in a format that corresponds to statistical model hypotheses 525 output by the recognizer(s) 520. Such format coherence enables the reranker 530 to process data output by both the FST component 510 and the recognizer(s) 520. FST hypotheses 515, output by the FST component 510, may be associated with respective weights.

In at least some implementations, the reranker 530 may implement some or all of the disambiguation policies described with respect to step 1106. In such implementations, the reranker 530 may receive all FST hypotheses 515 output by the FST component 510.

An FST hypothesis may include an intent indicator and NER labels/slots (as described below) representing the matched path to which the FST hypothesis corresponds. An FST hypothesis may be constructed by iterating through a corresponding matched path and extracting labels of the matched path. An FST hypothesis, constructed from a matched path including context information, may be associated with an indicator (e.g., a flag) representing such.

As detailed above, an FST may be specific to a domain. As such, resulting FST hypotheses may be domain specific. FSTs associated with different domains may be processed at least partially in parallel.

As described above, at least some FSTs may be specific to particular user identifiers. In such situations, the system may determine a user identifier associated with the present user input and may process with respect to only FSTs that are specifically associated with the user identifier.

Figure 12:
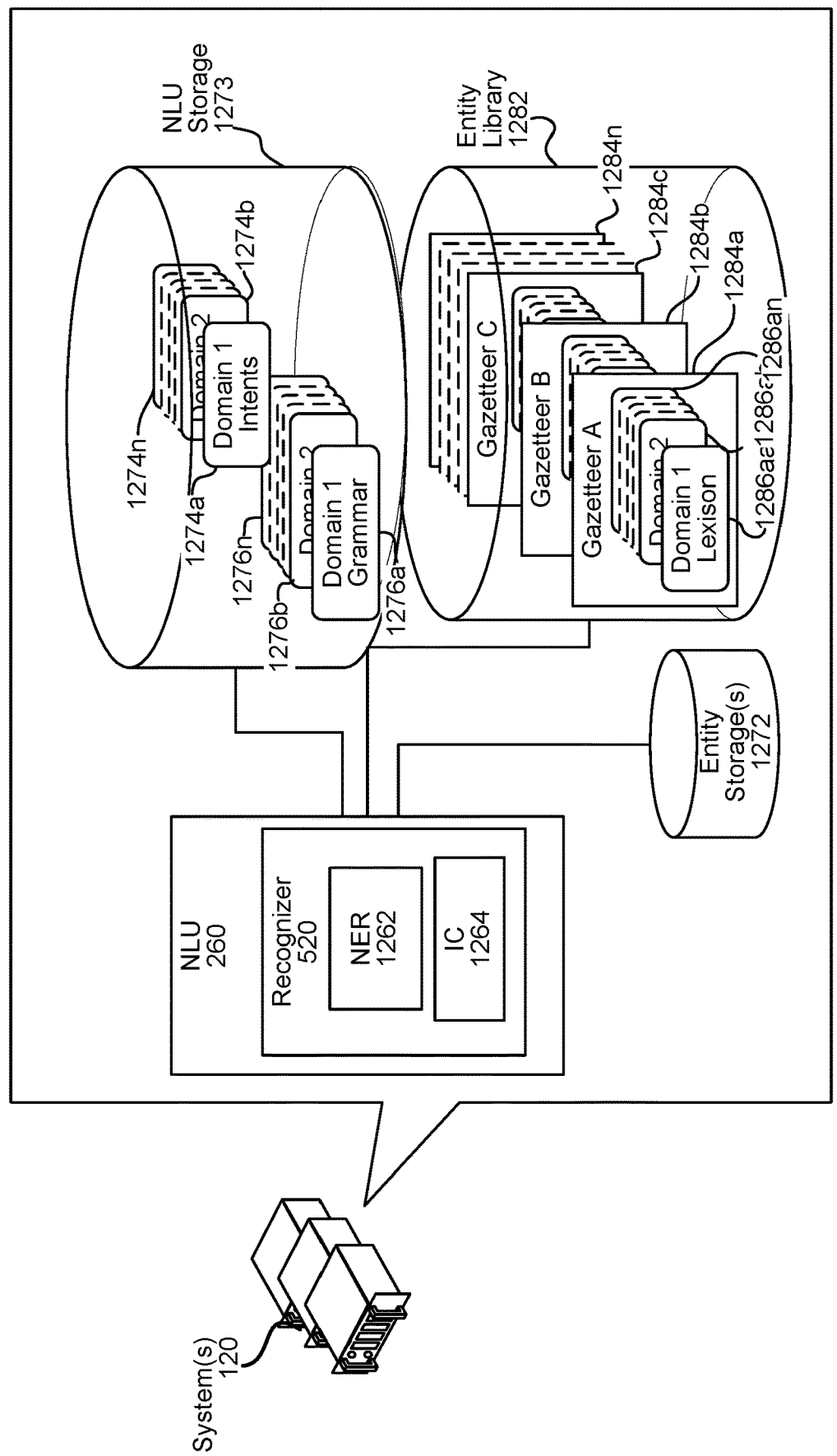
FIG. 12 is a conceptual diagram of how statistical models may be used during NLU processing according to embodiments of the present disclosure.
Figure 13:
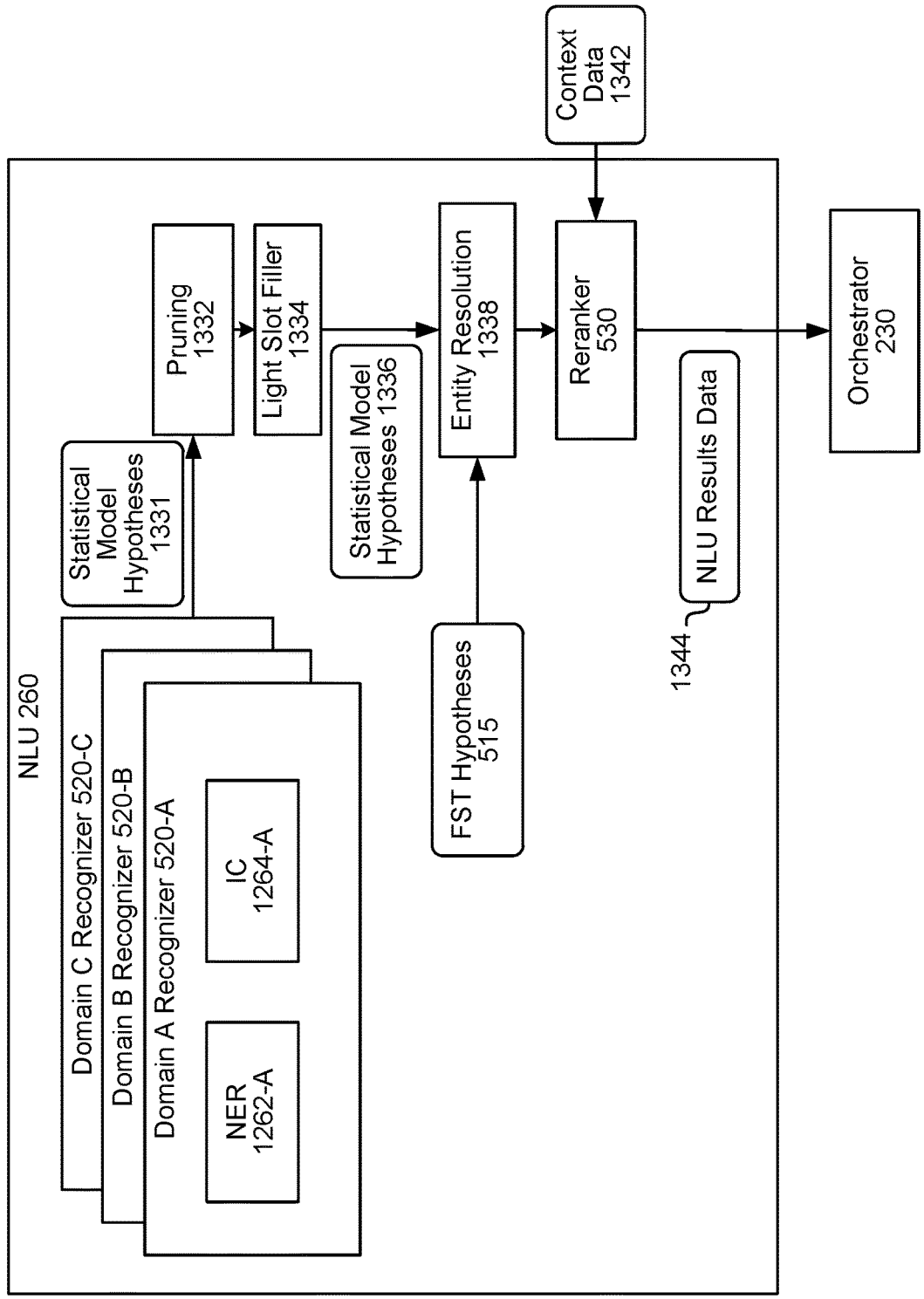
FIG. 13 is a conceptual diagram of how natural language understanding processing may be performed according to embodiments of the present disclosure.

As illustrated in FIG. 5, statistical models 520 may be implemented at least partially in parallel to the FSTs 510. FIG. 12 illustrates how statistical models (e.g., named entity recognition models, intent classification models, and domain classification models) may be used as part of NLU processing.

The NLU component 260 may include one or more recognizers 520. Each recognizer 520 may be associated with a different domain. Each recognizer 520 may process with respect to text data input to the NLU component 260. Each recognizer 520 may operate at least partially in parallel with other recognizers 520 of the NLU component 260.

Each recognizer 520 may include a named entity recognition (NER) component 1262. The NER component 1262 attempts to identify grammars and lexical information that may be used to construe meaning with respect to text data input therein. The NER component 1262 identifies portions of text data that correspond to a named entity associated with a domain, associated with the recognizer 520 implementing the NER component 1262. The NER component 1262 (or other component of the NLU component 260) may also determine whether a word refers to an entity whose identity is not explicitly mentioned in the text data, for example "him," "her," "it" or other anaphora, exophora, or the like.

Each recognizer 520, and more specifically each NER component 1262, may be associated with a particular grammar model and/or database 1273, a particular set of intents/actions 1274, and a particular personalized lexicon 1286. Each gazetteer 1284 may include domain-indexed lexical information associated with a particular user and/or device 110. For example, a Gazetteer A (1284a) includes domain-indexed lexical information 1286aa to 1286an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1262 applies grammar models 1276 and lexical information 1286 associated with a domain (associated with the recognizer 520 implementing the NER component 1262) to determine a mention of one or more entities in text data. In this manner, the NER component 1262 identifies "slots" (each corresponding to one or more particular words in text data) that may be useful for later processing. The NER component 1262 may also label each slot with a type (e.g., noun, place, city, artist name, song name, etc.).

Each grammar model 1276 includes the names of entities (i.e., nouns) commonly found in speech about the particular domain to which the grammar model 1276 relates, whereas the lexical information 1286 is personalized to the user and/or the device 110 from which the user input originated. For example, a grammar model 1276 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (1284a-1284n) stored in an entity library storage 1282. The gazetteer information 1284 may be used to match text data (representing a portion of the user input) with text data representing known entities, such as song titles, contact names, etc. Gazetteers 1284 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 520 may also include an intent classification (IC) component 1264. An IC component 1264 parses text data to determine an intent(s) (associated with the domain associated with the recognizer 520 implementing the IC component 1264) that potentially represents the user input. An intent represents to an action a user desires be performed. An IC component 1264 may communicate with a database 1274 of words linked to intents. For example, a music intent database may link words and phrases such as "quiet," "volume off," and "mute" to a <Mute> intent. An IC component 1264 identifies potential intents by comparing words and phrases in text data (representing at least a portion of the user input) to the words and phrases in an intents database 1274 (associated with the domain that is associated with the recognizer 520 implementing the IC component 1264).

The intents identifiable by a specific IC component 1264 are linked to domain-specific (i.e., the domain associated with the recognizer 520 implementing the IC component 1264) grammar frameworks 1276 with "slots" to be filled. Each slot of a grammar framework 1276 corresponds to a portion of text data that the system believes corresponds to an entity. For example, a grammar framework 1276 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1276 may not be structured as sentences, but rather based on associating slots with grammatical tags.

For example, an NER component 1262 may parse text data to identify words as subject, object, verb, preposition, etc. based on grammar rules and/or models prior to recognizing named entities in the text data. An IC component 1264 (implemented by the same recognizer 520 as the NER component 1262) may use the identified verb to identify an intent. The NER component 1262 may then determine a grammar model 276 associated with the identified intent. For example, a grammar model 1276 for an intent corresponding to <PlayMusic> may specify a list of slots applicable to play the identified "object" and any object modifier (e.g., a prepositional phrase), such as {Artist Name}, {Album Name}, {Song name}, etc. The NER component 1262 may then search corresponding fields in a lexicon 1286 (associated with the domain associated with the recognizer 520 implementing the NER component 1262), attempting to match words and phrases in text data the NER component 1262 previously tagged as a grammatical object or object modifier with those identified in the lexicon 1286.

An NER component 1262 may perform semantic tagging, which is the labeling of a word or combination of words according to their type/semantic meaning. An NER component 1262 may parse text data using heuristic grammar rules, or a model may be constructed using techniques such as Hidden Markov Models, maximum entropy models, log linear models, conditional random fields (CRF), and the like. For example, an NER component 1262 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1262 identifies "Play" as a verb based on a word database associated with the music domain, which an IC component 1264 (also implemented by the music domain recognizer) may determine corresponds to a <PlayMusic> intent. At this stage, no determination has been made as to the meaning of "mother's little helper" or "the rolling stones," but based on grammar rules and models, the NER component 1262 has determined the text of these phrases relates to the grammatical object (i.e., entity) of the user input represented in the text data.

An NER component 1262 may tag text data to attribute meaning thereto. For example, an NER component 1262 may tag "play mother's little helper by the rolling stones" as: {domain} Music, {intent}<PlayMusic>, {artist name} rolling stones, {media type} SONG, and {song title} mother's little helper. For further example, the NER component 1262 may tag "play songs by the rolling stones" as: {domain} Music, {intent}<PlayMusic>, {artist name} rolling stones, and {media type} SONG.

The NLU component 260 may generate statistical model hypotheses 1331, which may be output by one or more recognizers 520 (as illustrated in FIG. 12). A statistical model hypothesis may include tagged text data generated by an NER component 1262 and an IC component 1264 operated by a corresponding recognizer 520, as described above. Each statistical model hypothesis may be associated with a value (which may be referred to as a domain classification value) representing the recognizer 520's confidence in the statistical model hypothesis. For example, the statistical model hypotheses 1331 may be represented as, with each line representing a separate statistical model hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

While not illustrated, each statistical model hypotheses may also be associated with an IC value and a NER value. An IC value may represent an IC component's confidence that the intent indicator of a hypothesis corresponds to the user input. A NER value may represent a NER component's confidence that the slots of a hypothesis represent the user input.

The NLU component 260 may send the statistical model hypotheses 1331 to a pruning component 1332. The pruning component 1332 may sort the statistical model hypotheses 1331 according to their respective scores. The pruning component 1332 may then perform value thresholding with respect to the statistical model hypotheses 1331. For example, the pruning component 1332 may select one or more statistical model hypotheses associated with confidence values satisfying (e.g., meeting and/or exceeding) a threshold confidence value. The pruning component 1332 may also or alternatively perform number of statistical model hypothesis thresholding. For example, the pruning component 1332 may select a maximum threshold number of top scoring statistical model hypotheses. The pruning component 1332 may output a portion of the statistical model hypotheses 1331 input thereto. The purpose of the pruning component 1332 is to create a reduced list of statistical model hypotheses so that downstream, more resource intensive, processes may only operate on the statistical model hypotheses that most likely represent the user's intent.

The NLU component 260 may also include a light slot filler component 1334. The light slot filler component 1334 can take text data from slots, represented in the statistical model hypotheses output by the pruning component 1332, and alter it to make the text data more easily processed by downstream components. The light slot filler component 1334 may perform low latency operations that do not involve heavy operations such as reference to one or more entity storages. The purpose of the light slot filler component 1334 is to replace words with other words or values that may be more easily understood by downstream system components. For example, if a statistical model hypothesis includes the word "tomorrow," the light slot filler component 1334 may replace the word "tomorrow" with an actual date for purposes of downstream processing. Similarly, the light slot filler component 1334 may replace the word "CD" with "album" or the words "compact disc." The replaced words are then included in statistical model hypotheses 1336 (corresponding to the subset of the statistical model hypotheses 1331 output by the pruning component 1332, but include different text data where applicable).

An entity resolution component 1338 receives the statistical model hypotheses 1336 and the FST hypotheses 515. The entity resolution component 1338 can apply rules or other instructions to standardize labels or tokens from previous stages into an intent/slot representation. The precise transformation may depend on the domain. For example, for a travel domain, the entity resolution component 1338 may transform text data corresponding to "Boston airport" to the standard BOS three-letter code referring to the airport. The entity resolution component 1338 can refer to an entity storage(s) (including text data representing entities known to the system) to resolve the precise entity referred to in each slot of each statistical model hypothesis and FST hypothesis represented input thereto. Specific intent/slot combinations may also be tied to a particular source, which may then be used to resolve the text data. In the example "play songs by the stones," the entity resolution component 1338 may reference a personal music catalog, Amazon Music account, user profile data, or the like. The entity resolution component 1338 may output text data corresponding to the statistical model and FST hypotheses input thereto, but that includes more detailed information (e.g., entity IDs) about the specific entities mentioned in the slots and/or more detailed slot data that can eventually be used by a skill 290 (or other downstream component of the system). The NLU component 260 may include multiple entity resolution components 1338 and each entity resolution component 1338 may be associated with one or more particular domains.

The entity resolution component 1338 may use frameworks linked to intents to determine what database fields should be searched to determine the meaning of tagged entities, such as searching a user's gazetteer 1284 for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer 1284 does not resolve a slot/field using gazetteer information, the entity resolution component 1338 may search a database of generic words associated with the domain (in the entity storage(s) 1272). For example, if the text data includes "play songs by the rolling stones," after failing to determine an album name or song name called "songs" by "the rolling stones," the entity resolution component 1338 may search the domain vocabulary for the word "songs." In the alternative, generic words may be checked before the gazetteer information, or both may be tried, potentially producing two different results.

The NLU component 260 may include the reranker 530. The reranker 530 may rerank statistical model and FST hypotheses output by the entity resolution component 1338. The reranker 530 may be configured to output one or more FST hypotheses, and not output any statistical model hypotheses, if one or more FST hypotheses are input to the reranker 530. The reranker 530 may alternatively be configured to rerank statistical model and FST hypotheses based on various criteria.

In at least some examples, the reranker 530 may consider the number of FST hypotheses input thereto. If the reranker 530 determines more than one FST hypothesis (each corresponding to a different traversed FST path) is input to the reranker 530, the reranker 530 may determine only statistical model hypotheses should be reranked and output by the reranker 530.

The reranker 530 may not be a linear reranker. In other words, the reranker 530 may receive context data 1342 and use such context data 1342 to rerank hypotheses input thereto. In at least some examples, the reranker may be a DNN reranker. The context data 1342 may, in at least some examples, not but used by the recognizer(s) 520 in generating the statistical model hypotheses 1331. In such examples, the recognizer(s) 520 is context agnostic in that the recognizer(s) 520 is configured to generate all possible value statistical model hypotheses 1331. In such examples, the reranker 530's job may be to apply the context data 1342 to select the best one or more FST and/or statistical model hypotheses input to the reranker 530.

Each hypothesis input to the reranker 530 may be associated with a respective confidence value. The reranker 530 may use the input scores and other data (e.g., context data as described herein) to generate new scores for one or more of the hypotheses. The reranker 530 may use the new scores to rerank the hypotheses for output by the reranker 530. For example, a top scoring hypothesis as input to the reranker 530 may not be the top scoring hypothesis as output by the reranker 530.

The reranker 530 may output hypotheses representing the best interpretations of the user input. The reranker 530 may maintain a calibration with respect to ground truths. For example, if the model(s) of the reranker 530 determines it is producing a correct list of hypotheses, the model(s) may be configured to assign a high confidence value to its operations. Conversely, if the model(s) of the reranker 530 determines it is not confidence in its processing, the model(s) may be configured to assign a lower confidence value to its operations.

The reranker 530 may apply re-scoring, biasing, or other techniques to determine the top scoring hypotheses. To do so, the reranker 530 may consider not only the data output by the entity resolution component 1338, but may also consider context data 1342. The context data 1342 may include a variety of information. The context data 1342 may include skill rating or popularity data. For example, if one skill 290 has a particularly high rating, the reranker 530 may increase the confidence value of a hypothesis associated with that skill 290. The context data 1342 may also include information about skills 290 that have been enabled for the user identifier and/or device identifier associated with the current user input. For example, the reranker 530 may assign higher confidence values to hypotheses associated with enabled skills 290 than hypotheses associated with non-enabled skills 290. The context data 1342 may also include data indicating user usage history, such as if the user identifier associated with the current user input is regularly associated with user inputs that invoke a particular skill 290 or does so at particular times of day. The context data 1342 may additionally include data indicating date, time, location, weather, type of device 110, user identifier, device identifier, as well as other information. For example, the reranker 530 may consider when any particular skill 290 is currently active (e.g., music being played, a game being played, etc.) with respect to the user or device associated with the current user input. The context data 1342 may also include device type information. For example, if the device 110 does not include a display, the reranker 530 may decrease the confidence values associated with hypotheses that would result in displayable content being output by the system.

The context data 1342, input to the reranker 530, may be defined by the user associated with the user identifier, which is associated with the present user input. For example, user profile data, associated with the user identifier, may indicate a limited number of different types of context data that may be used by the system with respect to user input associated with the user identifier. In such examples, the types of context data 1342 that may be considered by the reranker 530 may be limited to those types of context information represented in the user profile data.

The context data 1342, input to the reranker 530, may be defined by one or more domains. For example, each domain may be associated with certain types of context data that may be useful in reranking hypotheses associated with the domain. The reranker 530 may determine the domains corresponding to the hypotheses input to the reranker 530, and may receive context data 1342 associated with those domains.

The reranker 530 may consider whether a hypothesis corresponds to an FST path that includes context information. As described previously, an FST hypothesis may be associated with an indicator representing the FST hypothesis corresponds to an FST path including context information. The reranker 530 may, in at least some examples, rerank FST hypotheses associated with such indicators higher than FST hypotheses not associated with such indicators. The reranker 530 may, in at least some examples, rerank FST hypotheses associated with the aforementioned indicators higher than statistical model hypotheses.

As illustrated and described, the entity resolution component 1338 is implemented prior to the reranker 530. The entity resolution component 1338 may alternatively be implemented after the reranker 530. In such implementation, the FST hypotheses 515 would be input to the reranker 530. Implementing the entity resolution component 1338 after the reranker 530 limits the hypotheses processed by the entity resolution component 1338 to only those hypotheses that successfully pass through the reranker 530.

The NLU component 260 may be configured with a global reranker (e.g., one that is not specific to any particular domain). Alternatively, the NLU component 260 may implement one or more domain-specific rerankers. Each domain-specific reranker may rerank FST and statistical model hypotheses associated with the domain. Each domain-specific reranker may output an n-best list of reranked hypotheses (e.g., 5-10 hypotheses).

Following ranking by the reranker 530 (or entity resolution, depending on implementation), the NLU component 260 may output NLU results data 1344 to the orchestrator component 230 (or another component of the system). The NLU results data 1344 may include multiple top scoring FST and/or statistical model hypotheses (e.g., in the form of an N-best list) as determined by the reranker 530. Alternatively, the NLU results data 1344 may include the top scoring FST or statistical model hypothesis as determined by the reranker 530. The NLU results data 1344 may be a rich data object representing intents and resolved entities. In at least some examples, the orchestrator component 230 (or other component of the system) may send at least a portion of the NLU results data 1344 to a skill 290, thereby invoking the skill 290 to perform an action responsive to the user input.

As described above, the FST component 510 may output FST hypotheses 515 in the same format as the statistical model hypotheses 525 output by the recognizer(s) 520. In at least some examples, however, the FST component 510 may not generate comparable confidence values to those output by the recognizer(s) 520 because the processes performed by the FST component 510 and the recognizer(s) 520 are different. For example, the FST component 510 may perform text matching between the text data 505 and FST paths whereas the recognizer(s) 520 use different types of grammar frameworks with slots. While the FST component 510 may output FST hypotheses 515 with corresponding weight values (e.g., corresponding to a cost of matching the text data 505 to an FST path), such weight values may not be normalized to confidence values output by the recognizer(s) 520.

Figure 14:
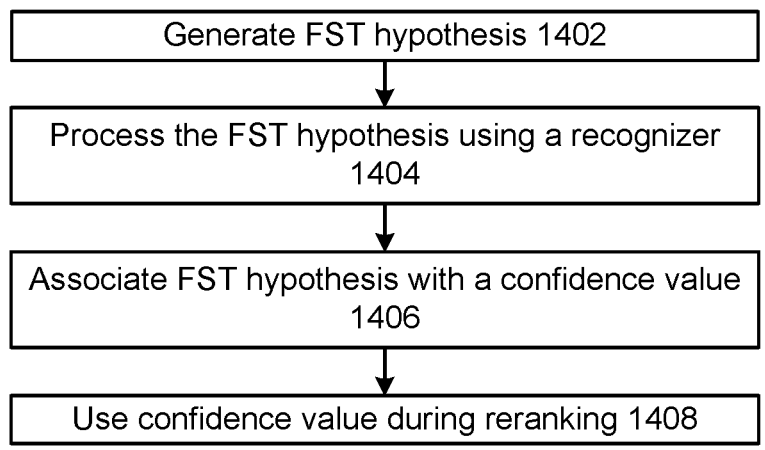
FIG. 14 is a process flow diagram illustrating how an FST hypothesis may be associated with a confidence value similar to that associated with statistical model hypotheses according to embodiments of the present disclosure.

FIG. 14 illustrates processing that may be performed to associate an FST hypothesis 515 with a confidence value similar to that assigned to a statistical model hypothesis 525. Such enables the single reranker 530 to process with respect to both the FST hypothesis 515 and the statistical model hypothesis 525. The FST component 510 generates (1402) an FST hypothesis including an intent indicator and NER entities corresponding to an FST path. A recognizer(s) 520, associated with a same domain as the FST hypothesis, processes (1404) the FST hypothesis and associates (1406) the FST hypothesis with a confidence value (similar to that that would be associated with a statistical model hypothesis). The FST hypothesis and associated confidence value is thereafter used (1408) to perform reranking as described above. Although a recognizer(s) 520 generated the confidence value, it may be beneficial to maintain that the FST hypothesis associated with such confidence value originated from the FST component 510.

In at least some instances, the recognizer(s) 520 may have generated a statistical model hypothesis corresponding to the intent indicator and NER entities of the FST hypothesis. When this occurs, rather than processing the FST hypothesis, the recognizer(s) 520 may simply assign the confidence value, previously generated for the corresponding statistical model hypothesis, to the FST hypothesis.

Figure 15:
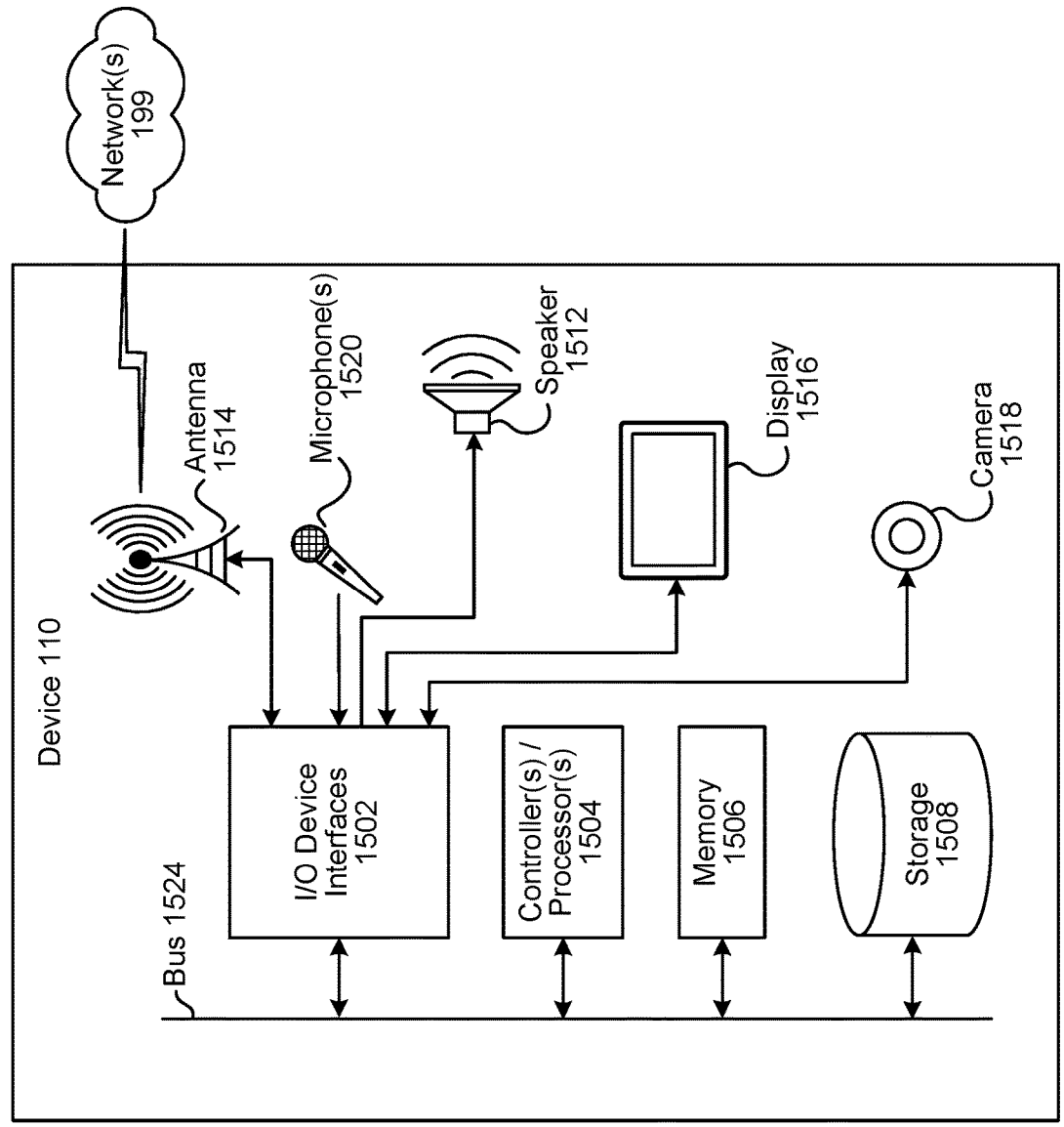
FIG. 15 is a block diagram conceptually illustrating example components of a device according to embodiments of the present disclosure.
Figure 16:
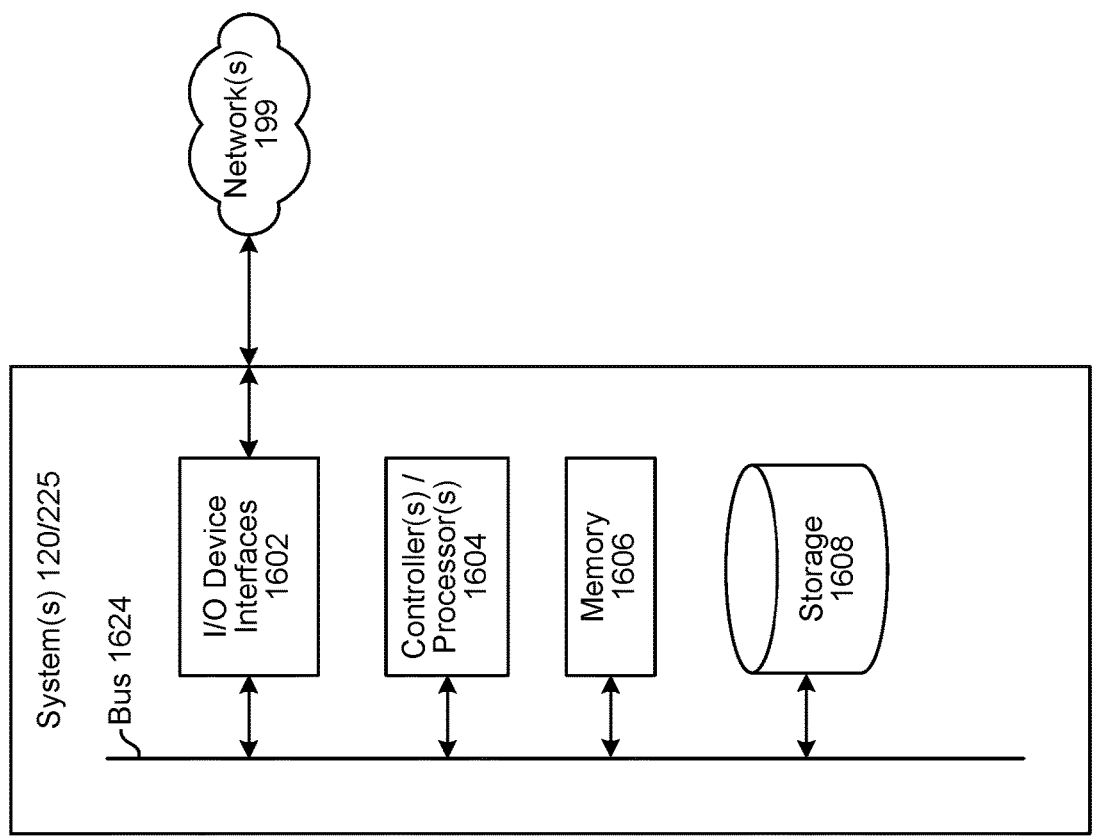
FIG. 16 is a block diagram conceptually illustrating example components of a server according to embodiments of the present disclosure.

FIG. 15 is a block diagram conceptually illustrating a device 110 that may be used with the system. FIG. 16 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/225) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1502/1602).

Computer instructions for operating each device (110/120/225) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/225) includes input/output device interfaces (1502/1602). A variety of components may be connected through the input/output device interfaces (1502/1602), as will be discussed further below. Additionally, each device (110/120/225) may include an address/data bus (1524/1624) for conveying data among components of the respective device. Each component within a device (110/120/225) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1502/1602), processor(s) (1504/1604), memory (1506/1606), and/or storage (1508/1608) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 17:
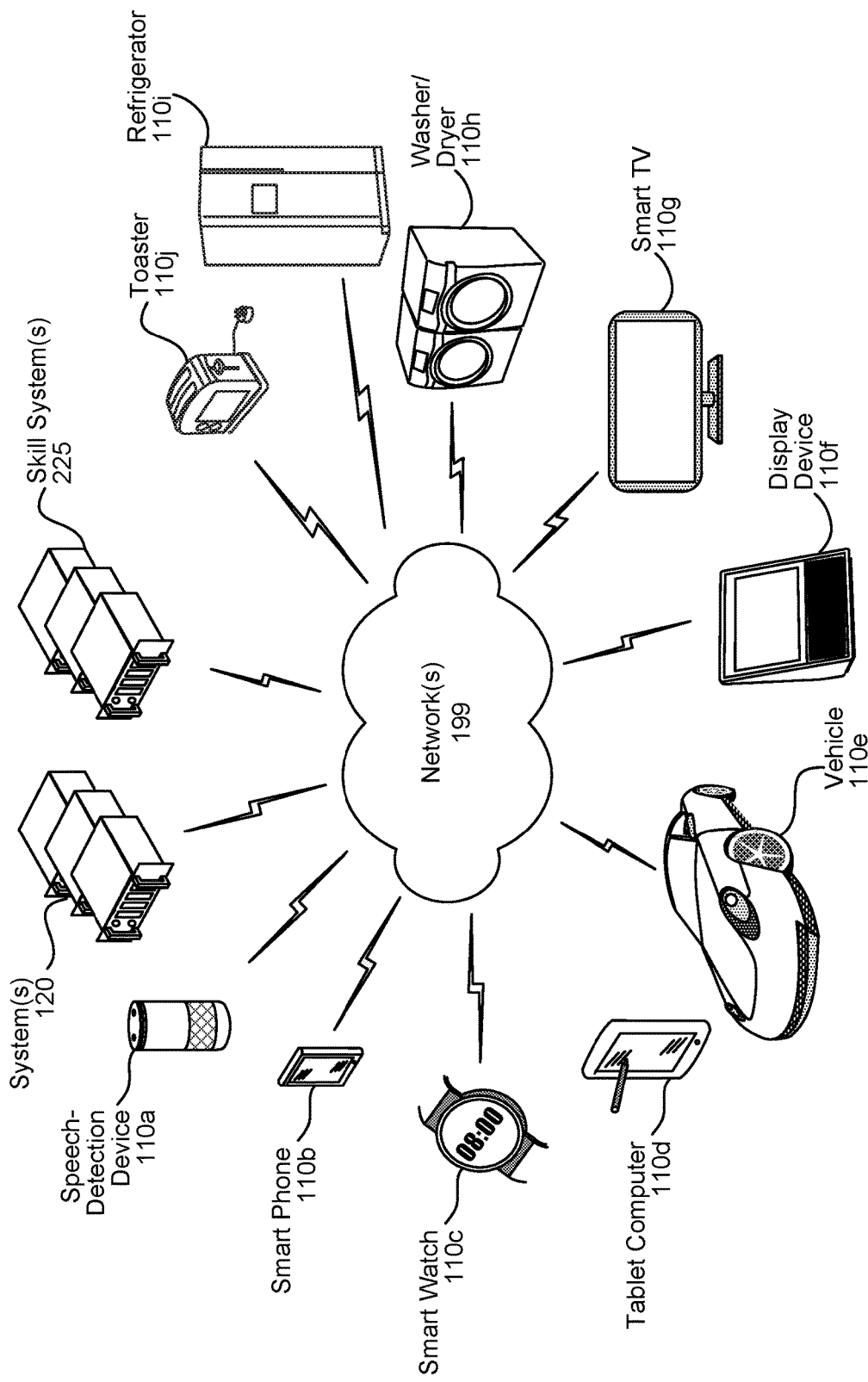
FIG. 17 illustrates an example of a computer network for use with the speech processing system.

As illustrated in FIG. 17, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, audio data representing a user input;
performing automatic speech recognition (ASR) processing on the audio data to generate ASR results data;
determining context data including at least a device type of the first device;
generating, using a finite state transducer (FST), a first natural language understanding (NLU) hypothesis including an intent, the first NLU hypothesis corresponding to a first FST path associated with the device type;
performing intent classification (IC) processing with respect to the ASR results data;
performing named entity recognition (NER) processing with respect to the ASR results data;
generating a second NLU hypothesis based at least in part on the IC processing and the NER processing;
processing, using a reranker component, the context data and the first NLU hypothesis to determine a first score;
processing, using the reranker component, the context data and the second NLU hypothesis to determine a second score; and
causing, based at least in part on the first score and the second score, an action to be performed using the first NLU hypothesis.

2. The method of claim 1, further comprising:
processing, using at least one statistical model, the first NLU hypothesis to determine a third score;
processing, using the at least one statistical model, the second NLU hypothesis to determine a fourth score; and
inputting, to the reranker component, the third score and the fourth score.

3. The method of claim 1, further comprising:
storing, based at least in part on the first FST path being associated with the device type, an association between the first NLU hypothesis and an indicator representing the first FST path is associated with context data; and
inputting the indicator to the reranker component.

4. The method of claim 1, further comprising:
determining a user identifier associated with the audio data; and
selecting the FST based at least in part on the FST being associated with the user identifier,
wherein the FST includes a plurality of FST paths including a second FST path, the second FST path being associated with context information represented in user profile data associated with the user identifier.

5. A method, comprising:
receiving first data representing a user input;
determining first context data associated with the user input;
generating, using a finite state transducer (FST), a first natural language understanding (NLU) hypothesis including a first intent corresponding to the user input, the first NLU hypothesis corresponding to a first FST path associated with the first context data;

generating, using at least one statistical model, a second NLU hypothesis including a second intent corresponding to the user input;

determining, using a reranker component, that the first NLU hypothesis is to be used to respond to the user input instead of the second NLU hypothesis; and causing an action to be performed using the first NLU hypothesis.

6. The method of claim 5, further comprising:

processing the first NLU hypothesis using the at least one statistical model to determine a first score;

determining, using the at least one statistical model, a second score corresponding to the second NLU hypothesis; and inputting, to the reranker component, the first score and the second score.

7. The method of claim 6, further comprising:

determining a domain associated with the first NLU hypothesis;

determining a first statistical model associated with the domain; and processing, using the first statistical model, the first NLU hypothesis to at least partially generate the first score.

8. The method of claim 5, further comprising:

generating, using the at least one statistical model, a third NLU hypothesis corresponding to the first NLU hypothesis;

determining a first score associated with the third NLU hypothesis; and associating the first score with the first NLU hypothesis.

9. The method of claim 5, further comprising:

associating the first NLU hypothesis with an indicator representing the first FST path is associated with the first context data; and inputting the indicator to the reranker component.

10. The method of claim 5, further comprising:

determining a user identifier associated with the first data; and determining the FST is associated with the user identifier, wherein the FST includes a plurality of FST paths including a second FST path, the second FST path being associated with second context data represented in user profile data associated with the user identifier.

11. The method of claim 5, further comprising:

performing intent classification (IC) processing with respect to the first data;

performing named entity recognition (NER) processing with respect to the first data; and generating the second NLU hypothesis based at least in part on the IC processing and the NER processing.

12. The method of claim 5, further comprising:

sending, to an NLU entity resolution component, an ordered list output by the reranker component, the ordered list including the first NLU hypothesis and the second NLU hypothesis.

13. A system, comprising:

at least one processor; and at least one memory comprising instructions that, when executed by the at least one processor, cause the system to:

receive first data representing a user input;

determine first context data associated with the user input;

generate, using a finite state transducer (FST), a first natural language understanding (NLU) hypothesis including a first intent corresponding to the user input, the first NLU hypothesis corresponding to a first FST path associated with the first context data;

generate, using at least one statistical model, a second NLU hypothesis including a second intent corresponding to the user input;

determine, using a reranker component, that the first NLU hypothesis is to be used to respond to the user input instead of the second NLU hypothesis; and cause an action to be performed using the first NLU hypothesis.

14. The system of claim 13, wherein the at least one memory further comprises instructions that, when executed by the at least one processor, further cause the system to:

process the first NLU hypothesis using the at least one statistical model to determine a first score;

determine, using the at least one statistical model, a second score corresponding to the second NLU hypothesis; and input, to the reranker component, the first score and the second score.

15. The system of claim 14, wherein the at least one memory further comprises instructions that, when executed by the at least one processor, further cause the system to:

determine a domain associated with the first NLU hypothesis;

determine a first statistical model associated with the domain; and process, using the first statistical model, the first NLU hypothesis to at least partially generate the first score.

16. The system of claim 13, wherein the at least one memory further comprises instructions that, when executed by the at least one processor, further cause the system to:

generate, using the at least one statistical model, a third NLU hypothesis corresponding to the first NLU hypothesis;

determine a first score associated with the third NLU hypothesis; and associate the first score with the first NLU hypothesis.

17. The system of claim 13, wherein the at least one memory further comprises instructions that, when executed by the at least one processor, further cause the system to:

associate the first NLU hypothesis with an indicator representing the first FST path is associated with context data; and input the indicator to the reranker component.

18. The system of claim 13, wherein the at least one memory further comprises instructions that, when executed by the at least one processor, further cause the system to:

determine a user identifier associated with the first data; and determine the FST is associated with the user identifier, wherein the FST includes a plurality of FST paths including a second FST path, the second FST path being associated with second context data represented in user profile data associated with the user identifier.

19. The system of claim 13, wherein the at least one memory further comprises instructions that, when executed by the at least one processor, further cause the system to:

perform intent classification (IC) processing with respect to the first data;

perform named entity recognition (NER) processing with respect to the first data; and generate the second NLU hypothesis based at least in part on the IC processing and the NER processing.

20. The system of claim 13, wherein the at least one memory further comprises instructions that, when executed by the at least one processor, further cause the system to:
    send, to an NLU entity resolution component, an ordered list output by the reranker component, the ordered list including the first NLU hypothesis and the second NLU hypothesis.

\* \* \* \* \*